United States Patent
Kogure et al.

(10) Patent No.: US 12,046,808 B2
(45) Date of Patent: Jul. 23, 2024

(54) RADIO-FREQUENCY MODULE AND COMMUNICATION DEVICE

(71) Applicant: Murata Manufacturing Co., Ltd., Nagaokakyo (JP)

(72) Inventors: Takeshi Kogure, Nagaokakyo (JP); Yoichi Sawada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 439 days.

(21) Appl. No.: 17/539,217

(22) Filed: Dec. 1, 2021

(65) Prior Publication Data

US 2022/0094047 A1 Mar. 24, 2022

Related U.S. Application Data

(63) Continuation of application No. PCT/JP2020/026204, filed on Jul. 3, 2020.

(30) Foreign Application Priority Data

Jul. 3, 2019 (JP) .................................. 2019-124837
May 14, 2020 (JP) .................................. 2020-085416

(51) Int. Cl.
*H04B 1/40* (2015.01)
*H01Q 1/22* (2006.01)
(Continued)

(52) U.S. Cl.
CPC .............. *H01Q 1/38* (2013.01); *H01Q 1/2283* (2013.01); *H01Q 3/42* (2013.01); *H04B 1/44* (2013.01); *H04L 5/14* (2013.01)

(58) Field of Classification Search
CPC .......... H01Q 1/38; H01Q 1/2283; H01Q 3/42; H01Q 1/405; H04B 1/44; H04L 5/14
See application file for complete search history.

(56) References Cited

U.S. PATENT DOCUMENTS 11,196,451 B2 * 12/2021 Hanaoka .................. H03F 1/56
2014/0159987 A1 * 6/2014 Robert .................. H01Q 9/065
343/861

(Continued)

FOREIGN PATENT DOCUMENTS

JP 2002-208873 A 7/2002
JP 2014-526857 A 10/2014
(Continued)

OTHER PUBLICATIONS

International Search Report and Written Opinion mailed on Sep. 8, 2020, received for PCT Application PCT/JP2020/026204, Filed on Jul. 3, 2020, 9 pages including English Translation.

(Continued)

Primary Examiner — John D Blanton
(74) Attorney, Agent, or Firm — XSENSUS LLP

(57) ABSTRACT

A radio-frequency module includes a mounting substrate, a transmission circuit element, and a reception circuit element. The mounting substrate has a first main surface and a second main surface. The transmission circuit element is provided on a signal path for a transmission signal of a first communication band. The reception circuit element is provided on a signal path for a reception signal of a second communication band. The second communication band is higher than the first communication band. The transmission circuit element is disposed on a same side of the mounting substrate as the first main surface of the mounting substrate. The reception circuit element is disposed on a same side of the mounting substrate as the second main surface of the mounting substrate.

20 Claims, 5 Drawing Sheets

(51) Int. Cl.
  *H01Q 1/38*   (2006.01)
  *H01Q 3/42*   (2006.01)
  *H04B 1/44*   (2006.01)
  *H04L 5/14*   (2006.01)

(56) References Cited

U.S. PATENT DOCUMENTS

2019/0384021 A1* 12/2019 Suzuki ................. G02B 6/3839
2022/0140869 A1*  5/2022 Ji ............................. H01Q 1/42
                                                              375/262
2022/0404457 A1* 12/2022 Mori ......................... G01S 7/03

FOREIGN PATENT DOCUMENTS

| JP | 2017-17691 A | 1/2017 |
| JP | 2018-23073 A | 2/2018 |
| WO | 2010/087304 A1 | 8/2010 |
| WO | 2019/054154 A1 | 3/2019 |

OTHER PUBLICATIONS

Written Opinion of the International Searching Authority mailed on Sep. 8, 2020, received for PCT Application PCT/JP2020/026204, filed on Jul. 3, 2020, 4 pages. (Previously filed; submitting English translation only.).

* cited by examiner

RADIO-FREQUENCY MODULE AND COMMUNICATION DEVICE

CROSS REFERENCE TO RELATED APPLICATION

The present application is based on and claims priority to PCT/JP2020/026204, filed Jul. 3, 2020, Japanese Patent Application No. 2019-124837 filed on Jul. 3, 2019, and Japanese Patent Application No. 2020-085416 filed on May 14, 2020. The entire disclosures of the above-identified applications, including the specifications, drawings and claims are incorporated herein by reference in their entirety.

BACKGROUND DISCLOSURE

1. Technical Field

The present disclosure generally relates to a radio-frequency module and a communication device, and more specifically relates to a radio-frequency module that includes a transmission circuit element for a first communication band and a reception circuit element for a second communication band, and to a communication device that includes the radio-frequency module.

2. Description of the Related Art

In the related art, radio-frequency modules that perform transmission and reception of two different communication bands are known (for example, refer to Japanese Unexamined Patent Application Publication No. 2017-17691).

A radio-frequency module described in Japanese Unexamined Patent Application Publication No. 2017-17691 includes a frequency division duplex (FDD) duplexer and a time division duplex (TDD) filter. The FDD duplexer includes an FDD transmission filter that allows an FDD transmission signal to pass therethrough and an FDD reception filter that allows an FDD reception signal to pass therethrough. The TDD filter allows a TDD transmission signal and a TDD reception signal to pass therethrough.

In the radio-frequency module of the related art described in Japanese Unexamined Patent Application Publication No. 2017-17691, for example, if a harmonic wave of a transmission signal of a first communication band (low band) overlaps the frequency band of a reception signal of a second communication band (high band), reception sensitivity to the reception signal of the second communication band may be reduced. In other words, isolation between transmission of the transmission signal of the first communication band and reception of the reception signal of the second communication band may be reduced.

SUMMARY

The present disclosure was made in consideration of this point, and it is an aspect of the present disclosure to provide a radio-frequency module and a communication device that can improve isolation between transmission of a transmission signal of a first communication band and reception of a reception signal of a second communication band.

A radio-frequency module according to an aspect of the present disclosure includes a mounting substrate having a first main surface and a second main surface, which are on opposite sides of the mounting substrate, a transmission circuit element that is provided on a signal path for a transmission signal of a first communication band, and a reception circuit element provided in a signal path for a reception signal of a second communication band, the second communication band being higher in frequency than the first communication band, wherein the transmission circuit element is disposed on a same side of the mounting substrate as the first main surface of the mounting substrate, and the reception circuit element is disposed on a same side of the mounting substrate as the second main surface of the mounting substrate.

A communication device according to an aspect of the present disclosure includes the above-described radio-frequency module and a signal processing circuit. The signal processing circuit processes the transmission signal of the first communication band and the reception signal of the second communication band.

With the radio-frequency module and the communication device according to the aspects of the present disclosure, isolation between transmission of the transmission signal of the first communication band and reception of the reception signal of the second communication band can be improved.

Other features, elements, characteristics, and advantages of the present disclosure will become more apparent from the following detailed description of preferred embodiments of the present disclosure with reference to the attached drawings.

DESCRIPTION OF THE EMBODIMENTS

Figure 1:
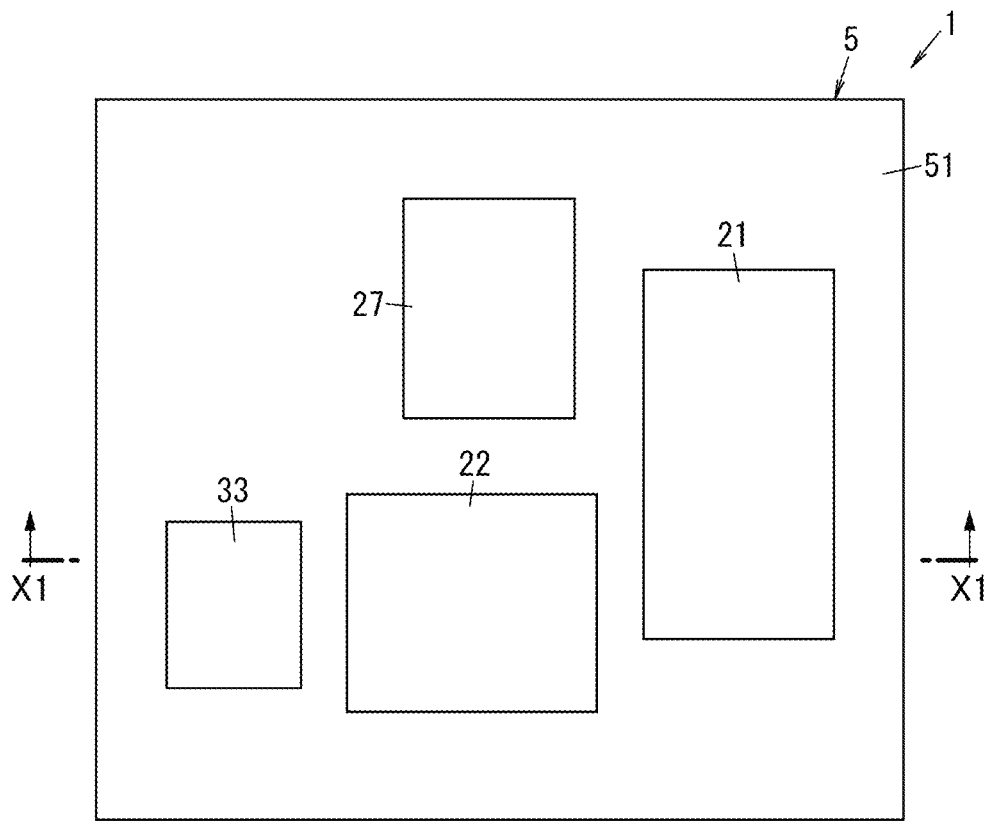
FIG. 1 is a plan view of a radio-frequency module according to Embodiment 1.

Hereafter, radio-frequency modules, and communication devices according to Embodiments 1 to 4 will be described while referring to the drawings. FIGS. 1 to 3, FIG. 5, FIG. 6, FIG. 8, and FIGS. 10 to 12 referred to in the following embodiments and so forth are schematic drawings and the sizes, thicknesses, and so forth of the individual constituent elements and the ratios therebetween in the drawings do not necessarily reflect the actual dimensional ratios.

In addition, in the present disclosure, "an arbitrary constituent element is disposed on a side where a first main surface of a mounting substrate is located" means that, for a mounting substrate having a first main surface and a second main surface that are on opposite sides of the mounting substrate, the constituent element is disposed nearer to the first main surface than to the second main surface of the mounting substrate. Examples of "an arbitrary constituent element is disposed on a side where a first main surface of a mounting substrate is located" include a case where the constituent element is disposed on the first main surface of the mounting substrate and a case where the constituent element is disposed so as to be separated from the first main surface of the mounting substrate. Examples of "an arbitrary constituent element is disposed on a first main surface of a mounting substrate" include a case where the constituent element is mounted on the first main surface of the mounting substrate and a case where part of the constituent element is mounted on the first main surface of the mounting substrate and the remainder of the constituent element is built into the mounting substrate. Examples of "an arbitrary constituent element is disposed so as to be separated from a first main surface of a mounting substrate" include a case where the constituent element and another constituent element are stacked. In this case, the other constituent element is mounted on the first main surface of the mounting substrate and the first constituent element is stacked on the other constituent element. Yet another constituent element may be interposed between the constituent element and the other constituent element.

Similarly, in the present disclosure, "an arbitrary constituent element is disposed on a side where a second main surface of a mounting substrate is located" means that, for a mounting substrate having a first main surface and a second main surface that face each other, the constituent element is disposed nearer to the second main surface than to the first main surface of the mounting substrate. Examples of "an arbitrary constituent element is disposed on a side where a second main surface of a mounting substrate is located" include a case where the constituent element is disposed on the second main surface of the mounting substrate and a case where the constituent element is disposed so as to be separated from the second main surface of the mounting substrate. Examples of "an arbitrary constituent element is disposed on a second main surface of a mounting substrate" include a case where the constituent element is mounted on the second main surface of the mounting substrate and a case in which part of the constituent element is mounted on the second main surface of the mounting substrate and the remainder of the constituent element is built into the mounting substrate. Examples of "a constituent element is disposed so as to be separated from a second main surface of a mounting substrate" include a case where the constituent element and another constituent element are stacked. In this case, the other constituent element is mounted on the second main surface of the mounting substrate and the first constituent element is stacked on the other constituent element. Yet another constituent element may be interposed between the constituent element and the other constituent element.

Embodiment 1

1 Radio-Frequency Module

The configuration of a radio-frequency module according to Embodiment 1 will be described while referring to the drawings.

Figure 4:
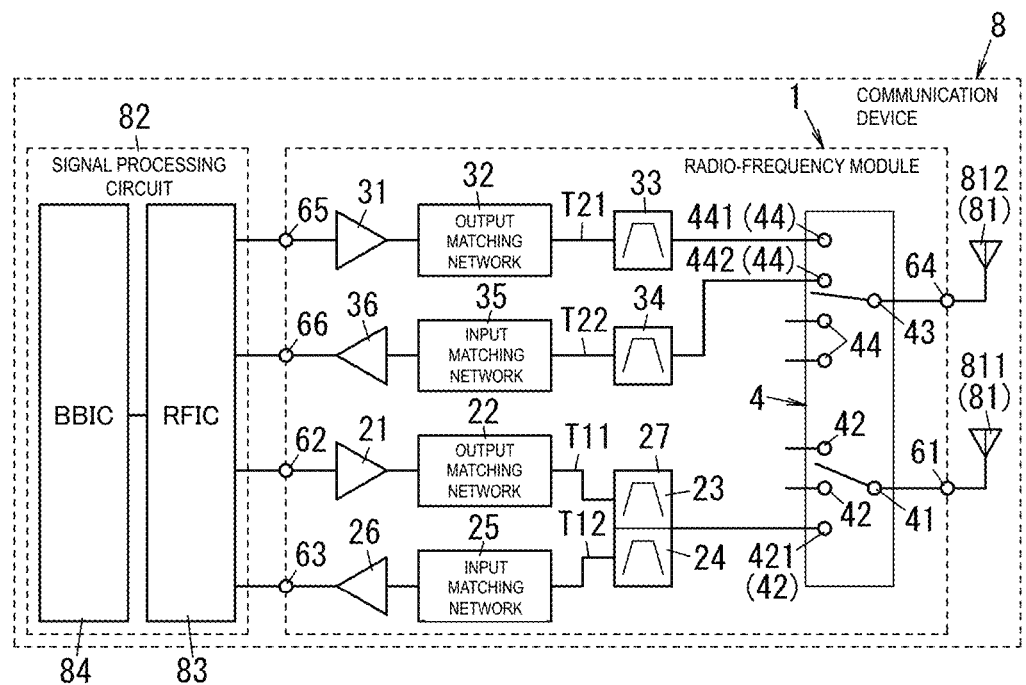
FIG. 4 is a circuit configuration diagram of a communication device according to Embodiment 1.

As illustrated in FIG. 4, a radio-frequency module 1 according to Embodiment 1 includes a first power amplifier 21, a first output matching network 22, a first transmission filter 23, a first reception filter 24, a first input matching network 25, and a first low-noise amplifier 26. The first transmission filter 23 and the first reception filter 24 form a duplexer 27. The radio-frequency module 1 further includes a second power amplifier 31, a second output matching network 32, a second transmission filter 33, a second reception filter 34, a second input matching network 35, a second low-noise amplifier 36, and an antenna switch 4.

Figure 2:
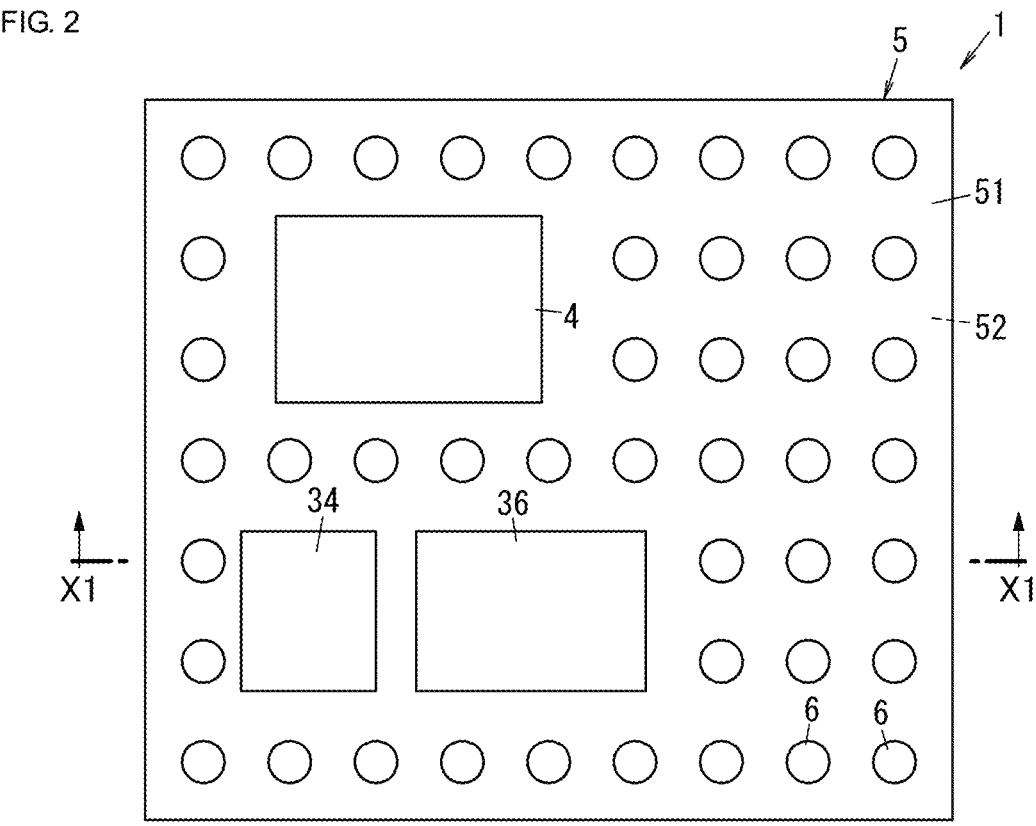
FIG. 2 is a transparent view of the radio-frequency module according to Embodiment 1.
Figure 3:
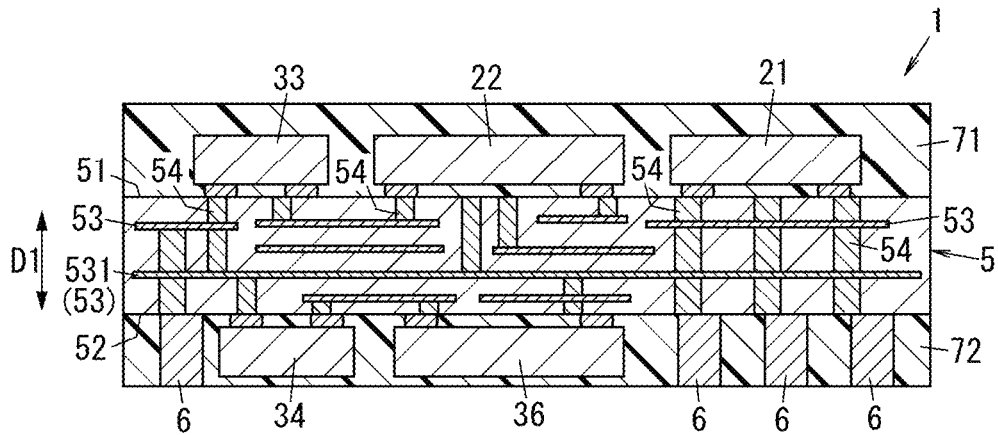
FIG. 3 is a sectional view of the radio-frequency module according to Embodiment 1 taken along line X1-X1 in FIG. 1.

As illustrated in FIGS. 1 to 3, the radio-frequency module 1 further includes a mounting substrate 5, a plurality of external connection terminals 6, a first resin member 71, and a second resin member 72.

As illustrated in FIG. 4, the radio-frequency module 1 is, for example, used in a communication device 8. The communication device 8 is, for example, a mobile phone such as a smart phone. The communication device 8 is not limited to being a mobile phone and may instead be a wearable terminal such as a smart watch, for example.

The radio-frequency module 1 performs communication in a first communication band and performs communication in a second communication band. In more detail, the radio-frequency module 1 performs transmission of a transmission signal of the first communication band (hereafter, "first transmission signal") and reception of a reception signal of the first communication band (hereafter, "first reception signal"). In addition, the radio-frequency module 1 performs transmission of a transmission signal of the second communication band (hereafter, "second transmission signal") and reception of a reception signal of the second communication band (hereafter, "second reception signal").

The first transmission signal and the first reception signal are frequency division duplex (FDD) signals. The first transmission signal and the first reception signal are not limited to being FDD signals and may instead be time division duplex (TDD) signals. TDD is a wireless communication technology in which the same frequency band is allocated to transmission and reception in wireless communication and transmission and reception are switched between at different times. FDD is a wireless communication technology in which transmission and reception are performed by allocating different frequency bands to transmission and reception in wireless communication.

The second transmission signal and the second reception signal are TDD signals. The second transmission signal and the second reception signal are not limited to being TDD signals and may instead be FDD signals.

The radio-frequency module 1 simultaneously performs communication in the first communication band and communication in the second communication band. Carrier aggregation (CA) is an example of simultaneous communication.

An example of a combination of the first communication band and the second communication band is a combination in which the first communication band is Band 11 and the second communication band is Band 42. In Band 11 used in FDD, the frequency band of the transmission signal is 1920 MHz to 1980 MHz and the frequency band of the reception signal is 2110 MHz to 2170 MHz. In Band 42 used in TDD, the frequency band of the transmission signal and the reception signal is 3400 MHz to 3600 MHz.

2 Circuit Configuration of Radio-Frequency Module

Hereafter, the circuit configuration of the radio-frequency module 1 according to Embodiment 1 will be described while referring to FIG. 4. Here, a case where the first transmission signal and the first reception signal are FDD signals and the second transmission signal and the second reception signal are TDD signals will be described.

2.1 Transmission in First Communication Band

The first power amplifier 21 is an amplifier that amplifies the first transmission signal. The first power amplifier 21 is provided between a first input terminal 62 and the first output matching network 22 along a first transmission path T11 connected between a first common terminal 61 and the first input terminal 62. The first power amplifier 21 has an input terminal and an output terminal, and the input terminal of the first power amplifier 21 is connected to an external circuit (for example, a signal processing circuit 82) via the first input terminal 62. The first input terminal 62 is a terminal to which a radio-frequency signal (first transmission signal) from an external circuit is input to the radio-frequency module 1. The output terminal of the first power amplifier 21 is connected to the first output matching network 22. The first power amplifier 21 is controlled by a power amplifier controller (not illustrated), for example.

The first output matching network 22 is provided between the first power amplifier 21 and the first transmission filter 23 along the first transmission path T11. The first output matching network 22 is a circuit for realizing impedance matching between the first power amplifier 21 and first transmission filter 23.

The first transmission filter 23 is a transmission filter for the first communication band that allows the first transmission signal to pass therethrough. In more detail, the first transmission filter 23 is provided between the first output matching network 22 and the antenna switch 4 along the first transmission path T11. The first transmission filter 23 allows a transmission signal of the transmission band of the first communication band, i.e., the first transmission signal, out of a radio-frequency signal amplified by the first power amplifier 21 to pass therethrough.

The first power amplifier 21, the first output matching network 22, and the first transmission filter 23 correspond to transmission circuit elements provided along the first transmission path T11 for the first transmission signal.

2.2 Reception in First Communication Band

The first reception filter 24 is a reception filter for the first communication band that allows the first reception signal to pass therethrough. In more detail, the first reception filter 24 is provided between the antenna switch 4 and the first input matching network 25 along a first reception path T12 connected between the first common terminal 61 and a first output terminal 63. The first reception filter 24 allows a reception signal of the reception band of the first communication band, i.e., the first reception signal out of a radio-frequency signal input from the first common terminal 61 to pass therethrough.

The first transmission filter 23 and the first reception filter 24 form the duplexer 27 having the first communication band as the pass band thereof.

The first input matching network 25 is provided between the first reception filter 24 and the first low-noise amplifier 26 along the first reception path T12. The first input matching network 25 realizes impedance matching between the first reception filter 24 and the first low-noise amplifier 26.

The first low-noise amplifier 26 is an amplifier that amplifies the first reception signal with low noise. The first low-noise amplifier 26 is provided between the first input matching network 25 and the first output terminal 63 along the first reception path T12. The first low-noise amplifier 26 has an input terminal and an output terminal, and the input terminal of the first low-noise amplifier 26 is connected to the first input matching network 25. The output terminal of the first low-noise amplifier 26 is connected to an external circuit (for example, the signal processing circuit 82) via the first output terminal 63. The first output terminal 63 is a terminal from which a radio-frequency signal (first reception signal) from the first low-noise amplifier 26 is output to an external circuit.

2.3 Transmission in Second Communication Band

The second power amplifier 31 is an amplifier that amplifies the second transmission signal. The second power amplifier 31 is provided between a second input terminal 65 and the second output matching network 32 along a second transmission path T21 connected between a second common terminal 64 and the second input terminal 65. The second power amplifier 31 has an input terminal and an output terminal, and the input terminal of the second power amplifier 31 is connected to an external circuit (for example, the signal processing circuit 82) via the second input terminal 65. The second input terminal 65 is a terminal to which a radio-frequency signal (second transmission signal) from an external circuit is input to the radio-frequency module 1. The output terminal of the second power amplifier 31 is connected to the second output matching network 32. The second power amplifier 31 is controlled by a power amplifier controller (not illustrated), for example.

The second output matching network 32 is provided between the second power amplifier 31 and the second transmission filter 33 along the second transmission path T21. The second output matching network 32 is a circuit for realizing impedance matching between the second power amplifier 31 and second transmission filter 33.

The second transmission filter 33 is a transmission filter for the second communication band that allows the second transmission signal to pass therethrough. In more detail, the second transmission filter 33 is provided between the second output matching network 32 and the antenna switch 4 along the second transmission path T21. The second transmission filter 33 allows a transmission signal of the transmission band of the second communication band, i.e., the second transmission signal, out of a radio-frequency signal amplified by the second power amplifier 31 to pass therethrough.

2.4 Reception in Second Communication Band

The second reception filter 34 is a reception filter for the second communication band that allows the second reception signal to pass therethrough. In more detail, the second reception filter 34 is provided between the antenna switch 4 and the second input matching network 35 along a second reception path T22 connected between the second common terminal 64 and a second output terminal 66. The second reception filter 34 allows a reception signal of the reception band of the second communication band, i.e., the second reception signal out of a radio-frequency signal input from the second common terminal 64 to pass therethrough.

The second input matching network 35 is provided between the second reception filter 34 and the second low-noise amplifier 36 along the second reception path T22. The second input matching network 35 realizes impedance matching between the second reception filter 34 and the second low-noise amplifier 36.

The second low-noise amplifier 36 is an amplifier that amplifies the second reception signal with low noise. The second low-noise amplifier 36 is provided between the second input matching network 35 and the second output terminal 66 along the second reception path T22. The second low-noise amplifier 36 has an input terminal and an output terminal, and the input terminal of the second low-noise amplifier 36 is connected to the second input matching network 35. The output terminal of the second low-noise amplifier 36 is connected to an external circuit (for example, the signal processing circuit 82) via the second output terminal 66. The second output terminal 66 is a terminal from which a radio-frequency signal (second reception signal) from the second low-noise amplifier 36 is output to an external circuit.

The second reception filter 34, the second input matching network 35, and the second low-noise amplifier 36 are reception circuit elements that are provided along a signal path for the reception signal of the second communication band, which is higher than the first communication band.

2.5 Antenna Switch

The antenna switch 4 has a first common terminal 41, a plurality of first selection terminals 42, a second common terminal 43, and a plurality of second selection terminals 44. The first common terminal 41 is connected to the first common terminal 61. A first selection terminal 421 among the plurality of first selection terminals 42 is connected to the duplexer 27. A first antenna 811 is connected to the first common terminal 61. The second common terminal 43 is connected to the second common terminal 64. Among the plurality of second selection terminals 44, a second selection terminal 441 is connected to the second transmission filter 33 and a second selection terminal 442 is connected to the second reception filter 34. A second antenna 812 is connected to the second common terminal 64.

The antenna switch 4 switches the connection state between the first common terminal 41 and the plurality of first selection terminals 42. In addition, the antenna switch 4 switches the connection state between the second common terminal 43 and the plurality of second selection terminals 44. In the radio-frequency module 1, the second selection terminal 441 and the second selection terminal 442 of the antenna switch 4 are exclusively connected to the second common terminal 43 during TDD communication. In more detail, the antenna switch 4 is, for example, controlled by the signal processing circuit 82. The antenna switch 4 electrically connects the first common terminal 41 and any one of the plurality of first selection terminals 42 to each other in accordance with a control signal from an RF signal processing circuit 83 of the signal processing circuit 82. In addition, the antenna switch 4 electrically connects the second common terminal 43 and any one of the plurality of second selection terminals 44 to each other in accordance with a control signal from the RF signal processing circuit 83 of the signal processing circuit 82.

3 Structure of Radio-Frequency Module

Hereafter, the structure of the radio-frequency module 1 according to Embodiment 1 will be described while referring to the drawings.

As illustrated in FIGS. 1 to 3, the radio-frequency module 1 includes the mounting substrate 5, the plurality of external connection terminals 6, the first resin member 71, and the second resin member 72.

The radio-frequency module 1 can be electrically connected to an external substrate (not illustrated). The external substrate, for example, corresponds to a mother substrate (e.g., motherboard) of a mobile phone, a communication device, or the like. Note that the meaning of "the radio-frequency module 1 can be electrically connected to an external substrate" includes not only a case where the radio-frequency module 1 is directly mounted on an external substrate but also a case where the radio-frequency module 1 is indirectly mounted on an external substrate. A case where the radio-frequency module 1 is indirectly mounted on an external substrate is, for example, a case where the radio-frequency module 1 is mounted on another radio-frequency module mounted on an external substrate.

3.1 Mounting Substrate

As illustrated in FIGS. 1 to 3, the mounting substrate 5 has a first main surface 51 and a second main surface 52. The first main surface 51 and the second main surface 52 face each other in a thickness direction D1 of the mounting substrate 5. The second main surface 52 faces an external substrate when the radio-frequency module 1 is installed on an external substrate (not illustrated). The mounting substrate 5 is a double-sided mounting substrate that has circuit components mounted on both the first main surface 51 and the second main surface 52.

The mounting substrate 5 is a multilayer substrate in which a plurality of dielectric layers are stacked. The mounting substrate 5 has a plurality of conductor pattern parts 53 and a plurality of through electrodes 54. The plurality of conductor pattern parts 53 includes a conductor pattern part 531 set to the ground potential. The plurality of through electrodes 54 are used to electrically connect elements mounted on the first main surface 51 and the conductor pattern parts 53 in the mounting substrate 5 to each other. In addition, the plurality of through electrodes 54 are used to electrically connect elements mounted on the first main surface 51 and elements mounted on the second main surface 52 to each other and to electrically connect the conductor pattern parts 53 in the mounting substrate 5 and the external connection terminals 6 to each other.

The first power amplifier 21, the first output matching network 22, the duplexer 27, and the second transmission filter 33 are disposed on the first main surface 51 of the mounting substrate 5. The second reception filter 34, the second low-noise amplifier 36, and the antenna switch 4 are disposed on the second main surface 52 of the mounting substrate 5. In addition, the plurality of external connection terminals 6 are disposed on the second main surface 52 of the mounting substrate 5.

3.2 Circuit Elements for First Communication Band

As illustrated in FIGS. 1 and 3, the first power amplifier 21 is disposed on the first main surface 51 of the mounting substrate 5. In the example in FIGS. 1 and 3, the first power amplifier 21 is mounted on the first main surface 51 of the mounting substrate 5. However, part of the first power amplifier 21 may be mounted on the first main surface 51 of the mounting substrate 5 and the remainder of the first power amplifier 21 may be built into the mounting substrate 5. In short, the first power amplifier 21 is disposed nearer to the first main surface 51 than to the second main surface 52 of the mounting substrate 5 and is at least partially mounted on the first main surface 51.

As illustrated in FIGS. 1 and 3, the first output matching network 22 is disposed on the first main surface 51 of the mounting substrate 5. In the example in FIGS. 1 and 3, the first output matching network 22 is mounted on the first main surface 51 of the mounting substrate 5. The first output matching network 22 includes at least one out of an inductor and a capacitor. The inductor is, for example, a chip-like element that is mounted on the first main surface 51 of the mounting substrate 5 or a wiring pattern part that is built into the mounting substrate 5. The capacitor is, for example, a chip-like element that is mounted on the first main surface 51 of the mounting substrate 5 or a wiring pattern part that is built into the mounting substrate 5. In short, the first output matching network 22 is disposed nearer to the first main surface 51 than to the second main surface 52 of the mounting substrate 5 and is at least partially mounted on the first main surface 51.

As described above, the duplexer 27 illustrated in FIGS. 1 and 3 includes the first transmission filter 23 (refer to FIG. 4) and the first reception filter 24 (refer to FIG. 4).

The first transmission filter 23 is, for example, an acoustic wave filter that includes a plurality of series arm resonators and a plurality of parallel arm resonators. The acoustic wave filter is, for example, a surface acoustic wave (SAW) filter that utilizes surface acoustic waves. In addition, the first transmission filter 23 may include at least one out of an inductor and a capacitor that is serially connected to any one of the plurality of series arm resonators and may include an inductor or a capacitor that is serially connected to any one of the plurality of parallel arm resonators.

Similarly, the first reception filter 24 is, for example, an acoustic wave filter that includes a plurality of series arm resonators and a plurality of parallel arm resonators. The acoustic wave filter is, for example, a SAW filter that utilizes surface acoustic waves. In addition, the first reception filter 24 may include at least one out of an inductor and a capacitor that is serially connected to any one of the plurality of series arm resonators and may include an inductor or a capacitor that is serially connected to any one of the plurality of parallel arm resonators.

As illustrated in FIGS. 1 and 3, the duplexer 27 is disposed on the first main surface 51 of the mounting substrate 5. In the example in FIGS. 1 and 3, the duplexer 27 is mounted on the first main surface 51 of the mounting substrate 5. Part of the duplexer 27 may be mounted on the first main surface 51 of the mounting substrate 5 and the remainder of the duplexer 27 may be built into the mounting substrate 5. In short, the duplexer 27 is disposed nearer to the first main surface 51 of the mounting substrate 5 than to the second main surface 52 of the mounting substrate 5 and is at least partially mounted on the first main surface 51.

Although not illustrated in FIGS. 1 to 3, the first input matching network 25 (refer to FIG. 4) is disposed on the second main surface 52 of the mounting substrate 5. The first input matching network 25 is, for example, mounted on the second main surface 52 of the mounting substrate 5. The first input matching network 25 includes at least one out of an inductor and a capacitor. The inductor is, for example, a chip-like element that is mounted on the second main surface 52 of the mounting substrate 5 or a wiring pattern part that is built into the mounting substrate 5. The capacitor is, for example, a chip-like element that is mounted on the second main surface 52 of the mounting substrate 5 or a wiring pattern part that is built into the mounting substrate 5. In short, the first input matching network 25 is disposed nearer to the second main surface 52 than to the first main surface 51 of the mounting substrate 5 and is at least partially mounted on the second main surface 52.

Although not illustrated in FIGS. 1 to 3, the first low-noise amplifier 26 (refer to FIG. 4) is disposed on the second main surface 52 of the mounting substrate 5. The first low-noise amplifier 26 is, for example, mounted on the second main surface 52 of the mounting substrate 5. Part of the first low-noise amplifier 26 may be mounted on the second main surface 52 of the mounting substrate 5 and the remainder of the first low-noise amplifier 26 may be built into the mounting substrate 5. In short, the first low-noise amplifier 26 is disposed nearer to the second main surface 52 than to the first main surface 51 of the mounting substrate 5 and is at least partially mounted on the second main surface 52.

3.3 Circuit Elements for Second Communication Band

As illustrated in FIGS. 1 and 3, the second transmission filter 33 is disposed on the first main surface 51 of the mounting substrate 5. In the example in FIGS. 1 and 3, the second transmission filter 33 is mounted on the first main surface 51 of the mounting substrate 5. Part of the second transmission filter 33 may be mounted on the first main surface 51 of the mounting substrate 5 and the remainder of the second transmission filter 33 may be built into the mounting substrate 5. In short, the second transmission filter 33 is provided separately from the second reception filter 34, and is disposed nearer to the first main surface 51 than to the second main surface 52 of the mounting substrate 5 and is at least partially mounted on the first main surface 51.

Part of the second transmission filter 33 overlaps the second reception filter 34 in plan view in the thickness direction D1 of the mounting substrate 5. The entirety of the second transmission filter 33 may overlap the second reception filter 34 in plan view in the thickness direction D1 of the mounting substrate 5. In short, it preferable that at least part of the second transmission filter 33 overlap the second reception filter 34 in plan view in the thickness direction D1 of the mounting substrate 5.

As illustrated in FIGS. 2 and 3, the second reception filter 34 is disposed on the second main surface 52 of the mounting substrate 5. In the example in FIGS. 2 and 3, the second reception filter 34 is mounted on the second main surface 52 of the mounting substrate 5. Part of the second reception filter 34 may be mounted on the second main surface 52 of the mounting substrate 5 and the remainder of the second reception filter 34 may be built into the mounting substrate 5. In short, the second reception filter 34 is disposed nearer to the second main surface 52 than to the first main surface 51 of the mounting substrate 5 and is at least partially mounted on the second main surface 52.

Part of the second reception filter 34 overlaps the second transmission filter 33 in plan view in the thickness direction D1 of the mounting substrate 5. The entirety of the second reception filter 34 may overlap the second transmission filter 33 in plan view in the thickness direction D1 of the mounting substrate 5. In short, it preferable that at least part of the second reception filter 34 overlap the second transmission filter 33 in plan view in the thickness direction D1 of the mounting substrate 5.

The second transmission filter 33 and the second reception filter 34 are used in transmission and reception of TDD signals. It is often the case that a single filter that allows TDD signals to pass therethrough is used for both transmission and reception, but in Embodiment 1, a transmission filter that allows a transmission signal to pass therethrough (second transmission filter 33) and a reception filter that allows a reception signal to pass therethrough (second reception filter 34) are separated provided. The second transmission filter 33 is disposed on the first main surface 51 of the mounting substrate 5 and the second reception filter 34 is disposed on the second main surface 52 of the mounting substrate 5.

As illustrated in FIGS. 2 and 3, the second low-noise amplifier 36 is disposed on the second main surface 52 of the mounting substrate 5. In the example in FIGS. 2 and 3, the second low-noise amplifier 36 is mounted on the second main surface 52 of the mounting substrate 5. In other words, the second low-noise amplifier 36 is disposed nearer to the second main surface 52 than to the first main surface 51 of the mounting substrate 5 and is at least partially mounted on the second main surface 52.

Although not illustrated in FIGS. 1 to 3, the second power amplifier 31 (refer to FIG. 4) is disposed on the first main surface 51 of the mounting substrate 5. The second power amplifier 31 is, for example, mounted on the first main surface 51 of the mounting substrate 5. However, part of the second power amplifier 31 may be mounted on the first main surface 51 of the mounting substrate 5 and the remainder of the second power amplifier 31 may be built into the mounting substrate 5. In short, the second power amplifier 31 is disposed nearer to the first main surface 51 than to the second main surface 52 of the mounting substrate 5 and is at least partially mounted on the first main surface 51.

Although not illustrated in FIGS. 1 to 3, the second output matching network 32 (refer to FIG. 4) is disposed on the first main surface 51 of the mounting substrate 5. The second output matching network 32 is, for example, mounted on the first main surface 51 of the mounting substrate 5. The second output matching network 32 includes at least one out of an inductor and a capacitor. The inductor is, for example, a chip-like element that is mounted on the first main surface 51 of the mounting substrate 5 or a wiring pattern part that is built into the mounting substrate 5. The capacitor is, for example, a chip-like element that is mounted on the first main surface 51 of the mounting substrate 5 or a wiring pattern part that is built into the mounting substrate 5. In short, the second output matching network 32 is disposed nearer to the first main surface 51 than to the second main surface 52 of the mounting substrate 5 and is at least partially mounted on the first main surface 51.

Although not illustrated in FIGS. 1 to 3, the second input matching network 35 (refer to FIG. 4) is disposed on the second main surface 52 of the mounting substrate 5. The second input matching network 35 is, for example, mounted on the second main surface 52 of the mounting substrate 5. The second input matching network 35 includes at least one out of an inductor and a capacitor. The inductor is, for example, a chip-like element that is mounted on the second main surface 52 of the mounting substrate 5 or a wiring pattern part that is built into the mounting substrate 5. The capacitor is, for example, a chip-like element that is mounted on the second main surface 52 of the mounting substrate 5 or a wiring pattern part that is built into the mounting substrate 5. In short, the second input matching network 35 is disposed nearer to the second main surface 52 than to the first main surface 51 of the mounting substrate 5 and is at least partially mounted on the second main surface 52.

3.4 Antenna Switch

As illustrated in FIG. 2, the antenna switch 4 is disposed on the second main surface 52 of the mounting substrate 5. The antenna switch 4 is, for example, mounted on the second main surface 52 of the mounting substrate 5. Alternatively, part of the antenna switch 4 may be mounted on the second main surface 52 of the mounting substrate 5 and the remainder of the antenna switch 4 may be built into the mounting substrate 5. In short, the antenna switch 4 is disposed nearer to the second main surface 52 than to the first main surface 51 of the mounting substrate 5 and is at least partially mounted on the second main surface 52.

The antenna switch 4 may be disposed on the first main surface 51 of the mounting substrate 5. The antenna switch 4 may be, for example, mounted on the first main surface 51 of the mounting substrate 5. Alternatively, part of the antenna switch 4 may be mounted on the first main surface 51 of the mounting substrate 5 and the remainder of the antenna switch 4 may be built into the mounting substrate 5. In short, the antenna switch 4 is disposed nearer to the first main surface 51 than to the second main surface 52 of the mounting substrate 5 and is at least partially mounted on the first main surface 51.

3.5 Outer Connection Terminals

As illustrated in FIGS. 2 and 3, the plurality of external connection terminals 6 are terminals for electrically connecting the mounting substrate 5 and an external substrate (not illustrated) to each other. The plurality of external connection terminals 6 includes the first common terminal 61, the first input terminal 62, the first output terminal 63, the second common terminal 64, the second input terminal 65, and the second output terminal 66 illustrated in FIG. 4, and a plurality of ground electrodes.

The plurality of external connection terminals 6 are disposed on the second main surface 52 of the mounting substrate 5. The plurality of external connection electrodes 6 are columnar (for example, cylindrical) electrodes provided on the second main surface 52 of the mounting substrate 5. The material of the plurality of external connection terminals 6 is, for example, a metal (for example, copper, a copper alloy, and so forth). Each of the plurality of external connection terminals 6 has, in the thickness direction D1 of the mounting substrate 5, a base end portion that is bonded to the second main surface 52 of the mounting substrate 5 and a tip end portion that is on the opposite side from the base end portion. The tip end portion of each of the plurality of external connection terminals 6 may include a metal plating layer, for example.

In the radio-frequency module 1, the plurality of external connection terminals 6 are provided from the viewpoint of improving ease of mounting of the radio-frequency module 1 on a mother substrate and increasing the number of ground electrodes of the radio-frequency module 1.

3.6 First Resin Member and Second Resin Member

As illustrated in FIG. 3, the first resin member 71 is provided on the first main surface 51 of the mounting substrate 5 and covers circuit elements disposed on the first main surface 51 and the first main surface 51 of the mounting substrate 5. The first resin member 71 has a function of ensuring reliability in terms of the mechanical strength, moisture resistance, and so forth of the circuit elements disposed on the first main surface 51.

As illustrated in FIG. 3, the second resin member 72 is provided on the second main surface 52 of the mounting substrate 5 and covers circuit elements disposed on the second main surface 52 and the second main surface 52 of the mounting substrate 5. The second resin member 72 has a function of ensuring reliability in terms of the mechanical strength, moisture resistance, and so forth of the circuit elements disposed on the second main surface 52.

3.7 Arrangement Relationships

As described above, the first power amplifier 21, the first output matching network 22, and the duplexer 27 are disposed nearer to the first main surface 51 than to the second main surface 52 of the mounting substrate 5, and is at least partially mounted on the first main surface 51. In other words, the first power amplifier 21, the first output matching network 22, and the duplexer 27 are disposed on the first main surface 51 of the mounting substrate 5. On the other hand, the second reception filter 34 and the second low-noise amplifier 36 are disposed nearer to the second main surface 52 than to the first main surface 51 of the mounting substrate 5 and is at least partially mounted on the second main surface 52. In other words, the second reception filter 34 and the second low-noise amplifier 36 are disposed on the second main surface 52 of the mounting substrate 5.

Thus, leakage of the first transmission signal from the first power amplifier 21, the first output matching network 22, and the first transmission filter 23 to the second reception filter 34 and the second low-noise amplifier 36 can be reduced. In particular, when the frequency of a harmonic wave of the first transmission signal is contained in the reception band of the second communication band, leaking of the harmonic wave of the first transmission signal to the second reception filter 34 and the second low-noise amplifier 36 can be reduced.

4 Detailed Structure of Each Constituent Element of Radio-Frequency Module 4.1 Mounting Substrate The mounting substrate 5 illustrated in FIGS. 1 to 3 is, for example, a low-temperature co-fired ceramic (LTCC) substrate or the like. In this case, the mounting substrate 5 is, for example, a multilayer substrate that includes a plurality of dielectric layers and a plurality of conductor pattern parts 53. The plurality of dielectric layers and the plurality of conductor pattern parts 53 are stacked in the thickness direction D1 of the mounting substrate 5. The plurality of conductor pattern parts 53 are formed in prescribed patterns. The plurality of conductor pattern parts 53 each include one or a plurality of conductor parts within a plane that is perpendicular to the thickness direction D1 of the mounting substrate 5. The material of the conductor pattern parts 53 is, for example, copper.

The first main surface 51 and the second main surface 52 of the mounting substrate 5 are separated from each other in the thickness direction D1 of the mounting substrate 5 and intersect the thickness direction D1 of the mounting substrate 5. The first main surface 51 of the mounting substrate 5 is, for example, perpendicular to the thickness direction D1 of the mounting substrate 5, but may, for example, include the side surfaces of conductor parts as surfaces that are not perpendicular to the thickness direction D1. The second main surface 52 of the mounting substrate 5 is, for example, perpendicular to the thickness direction D1 of the mounting substrate 5, but may, for example, include the side surfaces of electrically conductive parts as surfaces that are not perpendicular to the thickness direction D1. In addition, minute irregularities, recesses, or protrusions may be formed on the first main surface 51 and the second main surface 52 of the mounting substrate 5.

4.2 Filters

The duplexer 27, which includes the first transmission filter 23 and the first reception filter 24, and the second transmission filter 33 and the second reception filter 34 illustrated in FIG. 4 will be described next. In the following description, the duplexer 27, the second transmission filter 33, and the second reception filter 34 are each referred to as a filter without distinguishing between them.

Each filter is a one chip filter. In this case, in the filter, a plurality of series arm resonators and a plurality of parallel arm resonators each consist of acoustic wave resonators. In this case, for example, the filter includes a substrate, a piezoelectric layer, and a plurality of interdigital transducer (IDT) electrodes. The substrate has a first surface and a second surface. The piezoelectric layer is provided on the first surface of the substrate. The piezoelectric layer is provided on a low-acoustic-velocity film. The plurality of IDT electrodes are provided on the piezoelectric layer. In this case, the low-acoustic-velocity film is directly or indirectly provided on the substrate. In addition, the piezoelectric layer is directly or indirectly provided on the low-acoustic-velocity film. In the low-acoustic-velocity film, the acoustic velocity of a propagating bulk wave is lower than the acoustic velocity of an acoustic wave propagating through the piezoelectric layer. In the substrate, the acoustic velocity of a propagating bulk wave is higher than the acoustic velocity of an acoustic wave propagating through the piezoelectric layer. The material of the piezoelectric layer is, for example, composed of lithium tantalate. The material of the low-acoustic-velocity film is, for example, silicon oxide. The substrate is a silicon substrate, for example. The thickness of the piezoelectric layer is less than or equal to $3.5\lambda$, where $\lambda$ is the wavelength of an acoustic wave determined by the electrode finger period of the IDT electrodes. The thickness of the low-acoustic-velocity film is less than or equal to $2.0\lambda$, for example.

The piezoelectric layer is preferably formed of, for example, lithium tantalate, lithium niobate, zinc oxide, aluminum nitride, or lead zirconate titanate. In addition, the low-acoustic-velocity film preferably contains at least one material selected from a group consisting of silicon oxide, glass, silicon oxynitride, tantalum oxide, and a compound obtained by adding fluorine, carbon, or boron to silicon oxide. In addition, the substrate may also contain at least one material selected from a group consisting of silicon, aluminum nitride, aluminum oxide, silicon carbide, silicon nitride, sapphire, lithium tantalate, lithium niobate, quartz, alumina, zirconia, cordierite, mullite, steatite, forsterite, magnesia, and diamond.

The filter, for example, further includes a spacer layer and a cover member. The spacer layer and the cover member are provided on the first surface of the substrate. The spacer layer surrounds the plurality of IDT electrodes in plan view in the thickness direction of the substrate. The spacer layer is substantially frame shaped (substantially rectangular frame shaped) in plan view in the thickness direction of the substrate. The spacer layer has an electrically insulating property. The material of the spacer layer is, for example, a composite resin such as an epoxy resin or polyimide. The cover member has a substantially flat plate like shape. The cover member has a substantially rectangular shape in plan view in the thickness direction of the substrate, but not limited to this shape, may instead have a substantially square shape, for example. In the filter, the cover member, the spacer layer, and the cover member have substantially the same outer shape when viewed in plan view in the thickness direction of the substrate. The cover member is disposed on the spacer layer so as to face the substrate in the thickness direction of the substrate. The cover member overlaps the plurality of IDT electrodes in the thickness direction of the substrate and is separated from the plurality of IDT electrodes in the thickness direction of the substrate. The cover member has an electrically insulating property. The material of the cover member is, for example, a composite resin such as an epoxy resin or polyimide. The filter has a space that is surrounded by the substrate, the spacer layer, and the cover member. The space in the filter is filled with a gas. The gas is, for example, air, an inert gas (for example, nitrogen gas), or the like. A plurality of terminals are exposed from the cover member. Each of the plurality of terminals is, for example, a bump. Each bump is a solder bump, for example. The bumps are not limited to being solder bumps and may instead be gold bumps, for example.

The filter may include an adhesive layer interposed between the low-acoustic-velocity film and the piezoelectric layer, for example. The adhesive layer is, for example, composed of a resin (epoxy resin or polyimide resin). In addition, the filter may include a dielectric film between the low-acoustic-velocity film and the piezoelectric layer, on the piezoelectric layer, or under the low-acoustic-velocity film.

Furthermore, the filter may include a high-acoustic-velocity film interposed between the substrate and the low-acoustic-velocity film, for example. In this case, the high-acoustic-velocity film is directly or indirectly provided on the substrate. The low-acoustic-velocity film is directly or indirectly provided on the high-acoustic-velocity film. The piezoelectric layer is directly or indirectly provided on the low-acoustic-velocity film. In the high-acoustic-velocity film, the acoustic velocity of a propagating bulk wave is higher than the acoustic velocity of an acoustic wave propagating through the piezoelectric layer. In the low-acoustic-velocity film, the acoustic velocity of a propagating bulk wave is lower than the acoustic velocity of an acoustic wave propagating through the piezoelectric layer.

The high-acoustic-velocity film is composed of a piezoelectric material such as diamond-like carbon, aluminum nitride, aluminum oxide, silicon carbide, silicon nitride, silicon, sapphire, lithium tantalate, lithium niobate or quartz, any of various ceramics such as alumina, zirconia, cordierite, mullite, steatite or forsterite, magnesia, diamond, a material having any of these materials as a main component, or a material having a mixture of any of these materials as a main component.

Regarding the thickness of the high-acoustic-velocity film, since the high-acoustic-velocity film has a function of confining the acoustic waves to the piezoelectric layer and the low-acoustic-velocity film, the thicker the high-acoustic-velocity film the better. The piezoelectric substrate may include other films such as an adhesive layer, a dielectric film and so on in addition to high-acoustic-velocity film, the low-acoustic-velocity film, and the piezoelectric layer.

The plurality of series arm resonators and the plurality of parallel arm resonators are not limited to being acoustic wave resonators as described above, and may instead be SAW resonators or bulk acoustic wave (BAW) resonators, for example. In this case, for example, a SAW resonator includes a piezoelectric substrate and IDT electrodes provided on the piezoelectric substrate. In the case where a plurality of series arm resonators and a plurality of parallel arm resonators of the filter are formed of SAW resonators, the filter includes a plurality of IDT electrodes having a one-to-one correspondence with the plurality of series arm resonators and a plurality of IDT electrodes having a one-to-one correspondence with the plurality of parallel arm resonators on a single piezoelectric substrate. The piezoelectric substrate is, for example, a lithium tantalate substrate, a lithium niobate substrate, or the like.

4.3 Antenna Switch

The antenna switch 4 illustrated in FIG. 2 is a switch IC. In more detail, the antenna switch 4 is, for example, a one chip IC that includes a substrate and a switch function part. The substrate has a first surface and a second surface, which face each other. The substrate is a silicon substrate, for example. The switch function part includes a field effect transistor (FET) formed on the first surface of the substrate. The switch function part is a functional part having a function of switching a connection state. The antenna switch 4 is flip chip mounted on the second main surface 52 of the mounting substrate 5 so that the first surface of the substrate is located on the side near the second main surface 52 of the mounting substrate 5. The antenna switch 4 has a substantially quadrangular outer peripheral shape in plan view in the thickness direction D1 of the mounting substrate 5.

4.4 Power Amplifier

Next, the structures of the first power amplifier 21 and the second power amplifier 31 illustrated in FIG. 4 will be described in detail. In the following description, the first power amplifier 21 and the second power amplifier 31 are each referred to as a power amplifier without distinguishing between them.

Each power amplifier is, for example, a one chip IC that includes a substrate and an amplifying function part. The substrate has a first surface and a second surface, which face each other. The substrate is, for example, a gallium arsenide substrate. The amplifying function part includes at least one transistor formed on the first surface of the substrate. The amplifying function part is a functional part that has a function of amplifying a transmission signal of a prescribed frequency band. The transistor is, for example, a heterojunction bipolar transistor (HBT). In the power amplifier, a power supply voltage from a power amplifier controller is applied between the collector and the emitter of the HBT. The power amplifier may, for example, include a DC cut capacitor in addition to the amplifying function part. The power amplifier is flip chip mounted on the first main surface 51 of the mounting substrate 5 so that the first surface of the substrate is located on the side near the first main surface 51 of the mounting substrate 5. The power amplifier has a substantially quadrangular outer peripheral shape in plan view in the thickness direction D1 of the mounting substrate 5.

4.5 Low-Noise Amplifiers

Next, the structures of the first low-noise amplifier 26 and the second low-noise amplifier 36 illustrated in FIG. 4 will be described in detail. In the following description, the first low-noise amplifier 26 and the second low-noise amplifier 36 are each referred to as a low-noise amplifier without distinguishing between them.

Each low-noise amplifier is, for example, a single IC chip that includes a substrate and an amplifying function part. The substrate has a first surface and a second surface, which face each other. The substrate is a silicon substrate, for example. The amplifying function part is formed on the first surface of the substrate. The amplifying function part is a functional part that has a function of amplifying a reception signal of a prescribed frequency band. The low-noise amplifier is flip chip mounted on the second main surface 52 of the mounting substrate 5 so that the first surface of the substrate is located on the side near the second main surface 52 of the mounting substrate 5. The low-noise amplifier has a substantially quadrangular outer peripheral shape in plan view in the thickness direction D1 of the mounting substrate 5.

4.6 Output Matching Networks

Next, the structures of the first output matching network 22 and the second output matching network 32 illustrated in FIG. 4 will be described in detail. In the following description, the first output matching network 22 and the second output matching network 32 are each referred to as an output matching network without distinguishing between them.

Each of a plurality of inductors in the output matching networks is, for example, a chip inductor. The plurality of inductors in the output matching networks are, for example, mounted on the first main surface 51 of the mounting substrate 5, but are not limited to this arrangement. In addition, each of the plurality of capacitors of the output matching networks is a chip capacitor, for example. The plurality of capacitors in the output matching networks are, for example, mounted on the first main surface 51 of the mounting substrate 5, but are not limited to this arrangement. Each output matching network may be, for example, a one chip integrated passive device (IPD) that includes a substrate, a plurality of inductors, and a plurality of capacitors. The substrate has a first surface and a second surface, which face each other. The substrate is a silicon substrate, for example. The plurality of inductors and the plurality of capacitors are formed on the first surface of the substrate. In the case of an IPD, each output matching network is, for example, flip chip mounted on the first main surface 51 of the mounting substrate 5 so that the first surface of the substrate is located on the side near the first main surface 51 of the mounting substrate 5.

4.7 Input Matching Networks

Next, the structures of the first input matching network 25 and the second input matching network 35 illustrated in FIG. 4 will be described in detail. In the following description, the first input matching network 25 and the second input matching network 35 are each referred to as an input matching network without distinguishing between them.

The inductors in the input matching networks are chip inductors, for example.

The inductors in the input matching networks are, for example, mounted on the first main surface 51 of the mounting substrate 5, but are not limited to being mounted on the first main surface 51 of the mounting substrate 5.

5 Communication Device

As illustrated in FIG. 4, the communication device 8 includes the radio-frequency module 1, a plurality of (two in the illustrated example) antennas 81, and the signal processing circuit 82. The plurality of antennas 81 includes the first antenna 811 and the second antenna 812.

The first antenna 811 is connected to the first common terminal 61 of the radio-frequency module 1. The first antenna 811 has a transmission function of radiating the first transmission signal output from the radio-frequency module 1 in the form of radio waves and a reception function of receiving the first reception signal in the form of radio waves from the outside and outputting the received first reception signal to the radio-frequency module 1.

The second antenna 812 is connected to the second common terminal 64 of the radio-frequency module 1. The second antenna 812 has a transmission function of radiating the second transmission signal output from the radio-frequency module 1 in the form of radio waves and a reception function of receiving the second reception signal in the form of radio waves from the outside and outputting the received second reception signal to the radio-frequency module 1.

The signal processing circuit 82 includes, for example, the RF signal processing circuit 83 and a baseband signal processing circuit 84. The signal processing circuit 82 processes the first transmission signal and the first reception signal and the second transmission signal and the second reception signal.

The RF signal processing circuit 83 is, for example, a radio-frequency integrated circuit (RFIC) and performs signal processing on radio-frequency signals.

The RF signal processing circuit 83, for example, performs signal processing such as up conversion on a radio-frequency signal output from the baseband signal processing circuit 84 and outputs the radio-frequency signal resulting from this signal processing to the radio-frequency module 1. Specifically, the RF signal processing circuit 83 performs signal processing such as up conversion on the first transmission signal output from the baseband signal processing circuit 84 and outputs the first transmission signal on which the signal processing has been performed to the first transmission path T11 of the radio-frequency module 1. In addition, the RF signal processing circuit 83 performs signal processing such as up conversion on the second transmission signal output from the baseband signal processing circuit 84 and outputs the second transmission signal on which the signal processing has been performed to the second transmission path T21 of the radio-frequency module 1.

The RF signal processing circuit 83, for example, performs signal processing such as down conversion on a radio-frequency signal output from the radio-frequency module 1 and outputs the radio-frequency signal resulting from this signal processing to the baseband signal processing circuit 84. Specifically, the RF signal processing circuit 83 performs signal processing on the first reception signal output from the first reception path T12 of the radio-frequency module 1 and outputs the first reception signal on which the signal processing has been performed to the baseband signal processing circuit 84. In addition, the RF signal processing circuit 83 performs signal processing on the second reception signal output from the second reception path T22 of the radio-frequency module 1 and outputs the second reception signal on which the signal processing has been performed to the baseband signal processing circuit 84.

The baseband signal processing circuit 84 is, for example, a baseband integrated circuit (BBIC) and performs prescribed signal processing on a transmission signal from outside the signal processing circuit 82. A reception signal processing by the baseband signal processing circuit 84 is, for example, used as an image signal for image display or is used as an audio signal for a telephone call.

In addition, the RF signal processing circuit 83 also functions as a control unit that controls connections of antenna switch 4 of the radio-frequency module 1 on the basis of the communication band (frequency band) that is used. Specifically, the RF signal processing circuit 83 switches connections of the antenna switch 4 of the radio-frequency module 1 on the basis of a control signal (not illustrated). The control unit may be provided outside the RF signal processing circuit 83, and, for example, may be provided in the radio-frequency module 1 or the baseband signal processing circuit 84.

6 Effects

In the radio-frequency module 1 according to Embodiment 1, the first power amplifier 21, the first output matching network 22, and the first transmission filter 23 (transmission circuit elements), which are used for a transmission signal of the first communication band, are disposed on a side where the first main surface 51 of the mounting substrate 5 is located. In addition, the second reception filter 34, the second input matching network 35, and the second low-noise amplifier 36 (reception circuit elements), which are used for a reception signal of the second communication band, are disposed on a side where the second main surface 52 of the mounting substrate 5 is located. Since the transmission circuit elements and the reception circuit elements are disposed on opposite sides from each other with the mounting substrate 5 therebetween, leaking of a harmonic wave of the first transmission signal to the reception circuit elements can be made less likely to occur. As a result, isolation between transmission of the first transmission signal and reception of the second reception signal can be improved. This enables reception sensitivity to the second reception signal to be improved.

7 Modifications

Hereafter, modifications of Embodiment 1 will be described.

Figure 5:
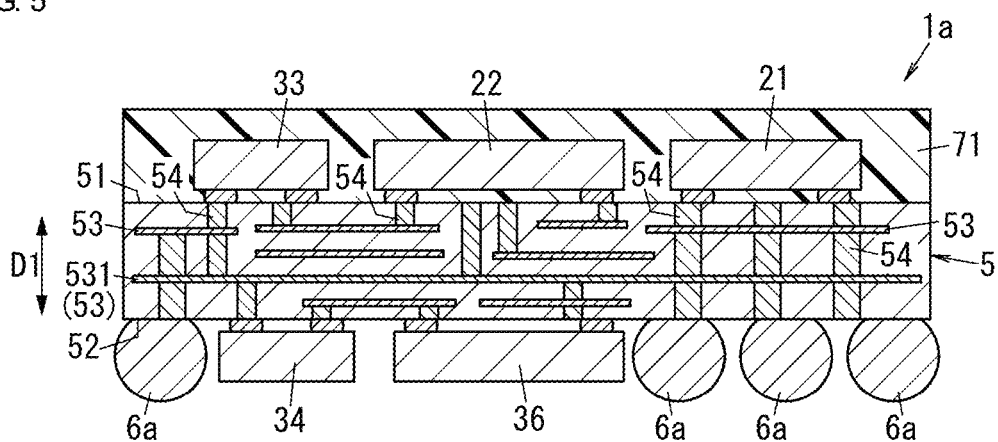
FIG. 5 is a sectional view of a radio-frequency module according to a modification of Embodiment 1.

As a modification of Embodiment 1, a radio-frequency module 1a may include a plurality of external connection terminals 6a as illustrated in FIG. 5 in addition to the plurality of external connection terminals 6 (refer to FIG. 3).

The plurality of external connection terminals 6a are not columnar electrodes and have a bump structure. The plurality of external connection terminals 6a are disposed on the second main surface 52 of the mounting substrate 5. In the radio-frequency module 1a according to this modification, the second resin member 72 is omitted.

In Embodiment 1, the first transmission filter 23 and the second transmission filter 33 are, for example, surface acoustic wave filters. However, as another modification of Embodiment 1, the first transmission filter 23 and the second transmission filter 33 are not limited to being surface acoustic wave filters and may be a type of filter other than a surface acoustic wave filter. The first transmission filter 23 and the second transmission filter 33 may be, for example, an acoustic wave filter that uses bulk acoustic waves (BAWs), an LC resonance filter, or a dielectric filter.

The radio-frequency modules according to these modifications also exhibit the same effects as the radio-frequency module 1 according to Embodiment 1.

Embodiment 2

Figure 6:
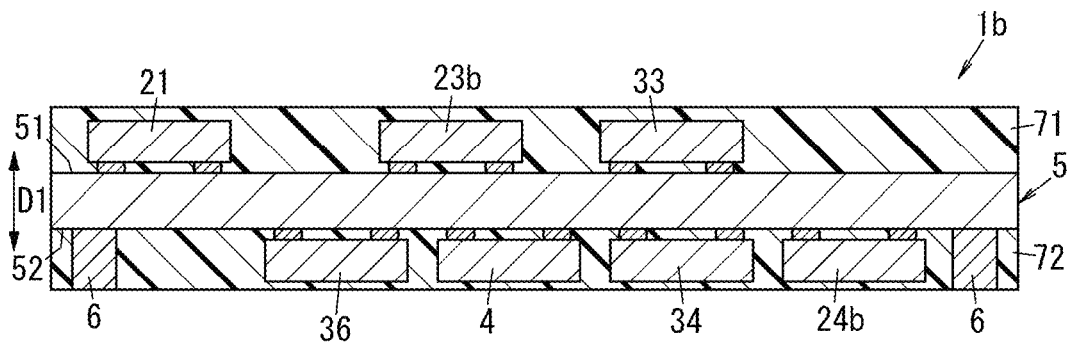
FIG. 6 is a sectional view of a radio-frequency module according to Embodiment 2.

As illustrated in FIG. 6, a radio-frequency module 1b according to Embodiment 2 differs from the radio-frequency module 1 according to Embodiment 1 (refer to FIG. 3) in that a first transmission filter 23b and a first reception filter 24b are disposed on opposite surfaces from each other.

1 Radio-Frequency Module

As illustrated in FIG. 6, the radio-frequency module 1b according to Embodiment 2 includes the first transmission filter 23b and the first reception filter 24b instead of the first transmission filter 23 and the first reception filter 24. The radio-frequency module 1b is, for example, used in a communication device 8b. Constituent elements of the radio-frequency module 1b according to Embodiment 2 that are identical to those of the radio-frequency module 1 according to Embodiment 1 are denoted by the same symbols and description thereof is omitted.

2 Arrangement Configuration of Radio-Frequency Module

As illustrated in FIG. 6, the first transmission filter 23b is disposed on the first main surface 51 of the mounting substrate 5. In the example in FIG. 6, the first transmission filter 23b is mounted on the first main surface 51 of the mounting substrate 5. The first transmission filter 23b is disposed nearer to the first main surface 51 than to the second main surface 52 of the mounting substrate 5 and is at least partially mounted on the first main surface 51. Descriptions of the configurations and functions of the first transmission filter 23b of Embodiment 2 that are the same as those of the first transmission filter 23 of Embodiment 1 (refer to FIG. 3) are omitted.

The first reception filter 24b is provided separately from the first transmission filter 23b and is disposed on the second main surface 52 of the mounting substrate 5. The first reception filter 24b is disposed nearer to the second main surface 52 than to the first main surface 51 of the mounting substrate 5 and is at least partially mounted on the second main surface 52. Descriptions of the configurations and functions of the first reception filter 24b of Embodiment 2 that are the same as those of the first reception filter 24 of Embodiment 1 (refer to FIG. 3) are omitted.

3 Circuit Configuration of Radio-Frequency Module

Figure 7:
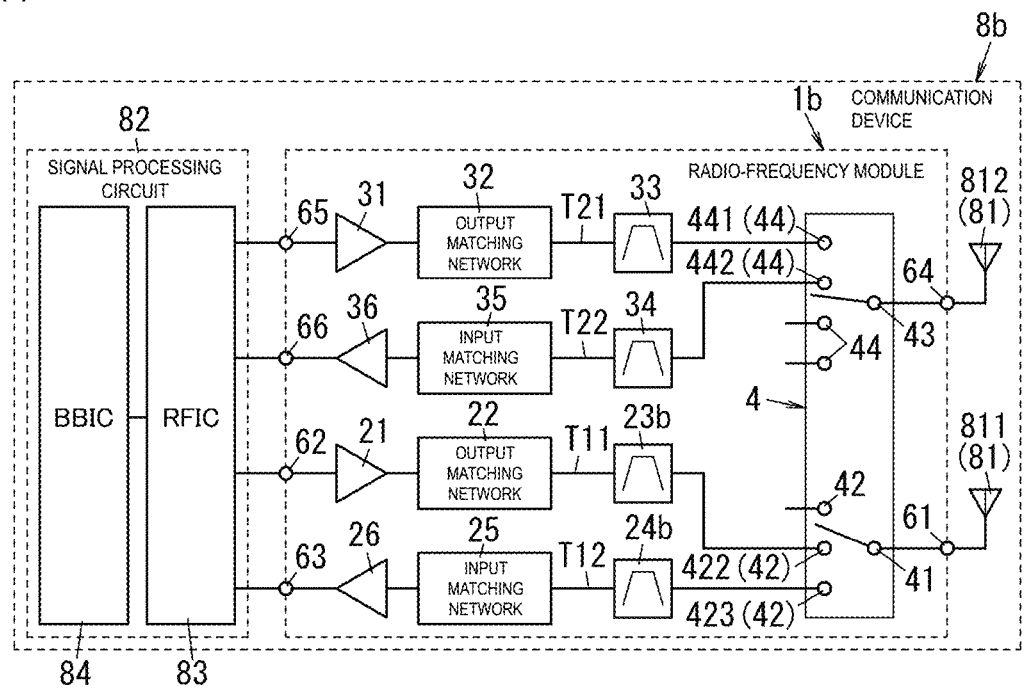
FIG. 7 is a circuit configuration diagram of a communication device according to Embodiment 2.

As illustrated in FIG. 7, similarly to the first transmission filter 23, the first transmission filter 23b is a transmission filter for the first communication band that allows the first transmission signal to pass therethrough. The first transmission filter 23b corresponds to a transmission circuit element provided on the first transmission path T11 for the first transmission signal.

Similarly to the first reception filter 24, the first reception filter 24b is a reception filter for the first communication band that allows the first reception signal to pass therethrough.

4 Effects

In the radio-frequency module 1b according to Embodiment 2, the first transmission filter 23b for the first communication band and the first reception filter 24b for the first communication band are disposed on opposite surfaces from each other. This enables the isolation between transmission in the first communication band and reception in the first communication band to be improved.

5 Modifications

As a modification of Embodiment 2, similarly to the modification of Embodiment 1, the radio-frequency module 1b may include a plurality of external connection terminals 6a as illustrated in FIG. 5 instead of the plurality of external connection terminals 6.

The radio-frequency module 1b according to this modification also exhibits the same effects as the radio-frequency module 1b according to Embodiment 2.

Embodiment 3

Figure 8:
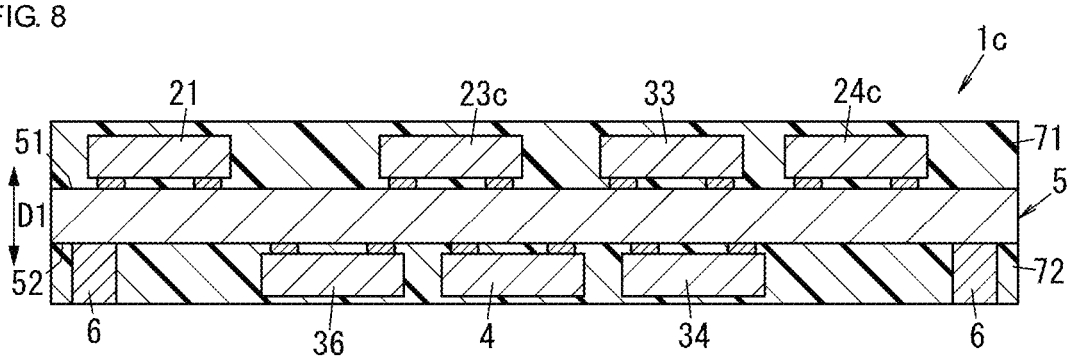
FIG. 8 is a sectional view of a radio-frequency module according to Embodiment 3.

As illustrated in FIG. 8, a radio-frequency module 1c according to Embodiment 3 differs from the radio-frequency module 1b according to Embodiment 2 (refer to FIG. 6) in that a first transmission filter 23c and a first reception filter 24c are disposed on the same main surface. Constituent elements of the radio-frequency module 1c according to Embodiment 3 that are identical to those of the radio-frequency module 1b according to Embodiment 2 are denoted by the same symbols and description thereof is omitted.

1 Arrangement Configuration of Radio-Frequency Module

As illustrated in FIG. 8, the first reception filter 24c is provided separately from the first transmission filter 23c. The first reception filter 24c is disposed on the first main surface 51 of the mounting substrate 5. The first reception filter 24c is mounted on the first main surface 51 of the mounting substrate 5. The first reception filter 24c is disposed nearer to the first main surface 51 than to the second main surface 52 of the mounting substrate 5 and is at least partially mounted on the first main surface 51.

Similarly to the first transmission filter 23b and the second transmission filter 33 of Embodiment 2, the first transmission filter 23c and the second transmission filter 33 are disposed nearer to the first main surface 51 than to the second main surface 52 of the mounting substrate 5.

2 Effects

In the radio-frequency module 1c according to Embodiment 3, the second reception filter 34 for the second communication band is disposed on the second main surface 52 of the mounting substrate 5. In addition, the first transmission filter 23c for the first communication band and the first reception filter 24c for the first communication band are disposed on the first main surface 51 of the mounting substrate 5. This enables isolation between transmission in the first communication band and reception in the second communication band to be improved while increasing the degree of freedom in arranging circuit elements on the second main surface 52 of the mounting substrate 5.

3 Modifications

As a modification of Embodiment 3, similarly to the modification of Embodiment 1, the radio-frequency module 1c may include a plurality of external connection terminals 6a as illustrated in FIG. 5 instead of the plurality of external connection terminals 6.

The radio-frequency module 1c according to this modification also exhibits the same effects as the radio-frequency module 1c according to Embodiment 3.

Embodiment 4

A radio-frequency module 1d according to Embodiment 4 differs from the radio-frequency module 1 according to Embodiment 1 (refer to FIG. 4) in that both communication in the first communication band and communication in the second communication band use TDD. Constituent elements of the radio-frequency module 1d according to Embodiment 4 that are identical to those of the radio-frequency module 1 according to Embodiment 1 are denoted by the same symbols and description thereof is omitted.

1 Circuit Configuration of Radio-Frequency Module

Figure 9:
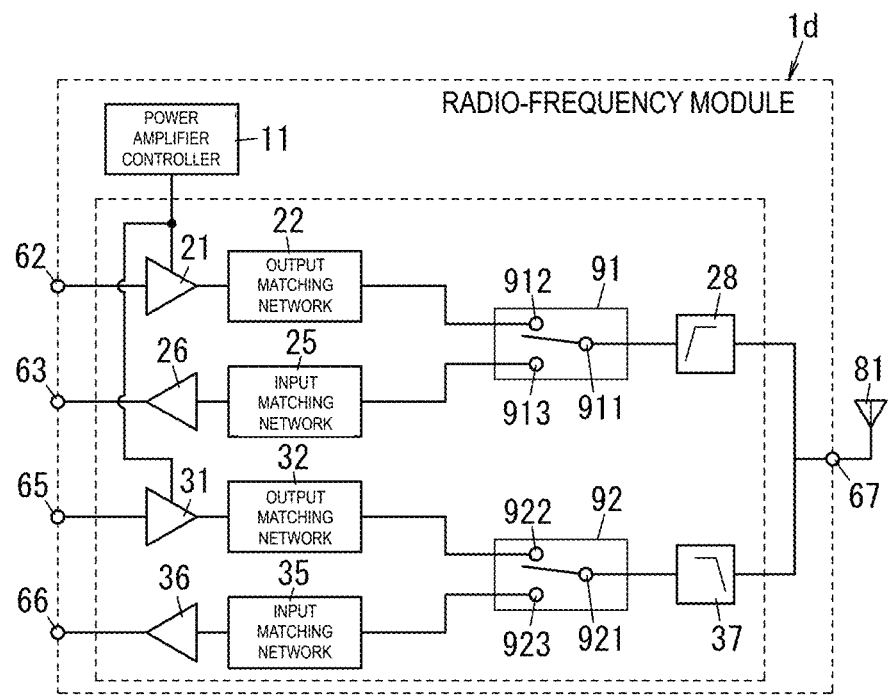
FIG. 9 is a circuit configuration diagram of a communication device according to Embodiment 4.

As illustrated in FIG. 9, the radio-frequency module 1d includes the first power amplifier 21, the first output matching network 22, the first input matching network 25, the first low-noise amplifier 26, a first filter 28 (first transmission filter/first reception filter), and a first switch 91. In addition, the radio-frequency module 1d includes the second power amplifier 31, the second output matching network 32, a second filter 37, the second input matching network 35, the second low-noise amplifier 36, the second filter 37, and a second switch 92. The radio-frequency module 1d is used in the communication device 8 (refer to FIG. 4) similarly to the radio-frequency module 1 according to Embodiment 1 (refer to FIG. 4).

Figure 10:
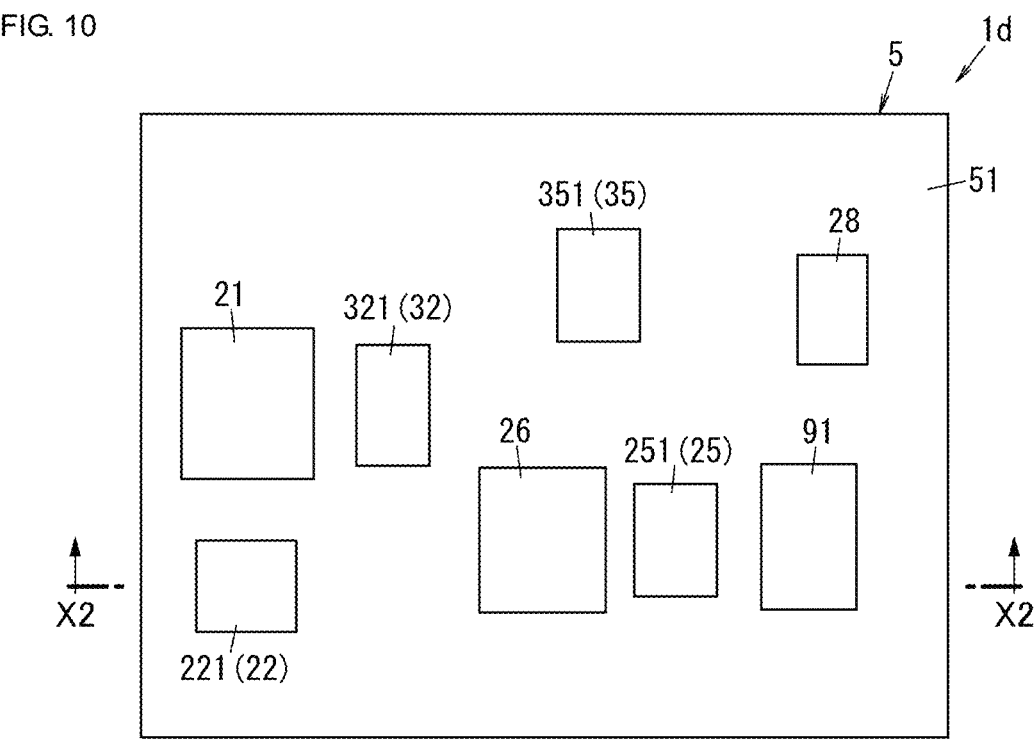
FIG. 10 is a plan view of a radio-frequency module according to Embodiment 4.
Figure 11:
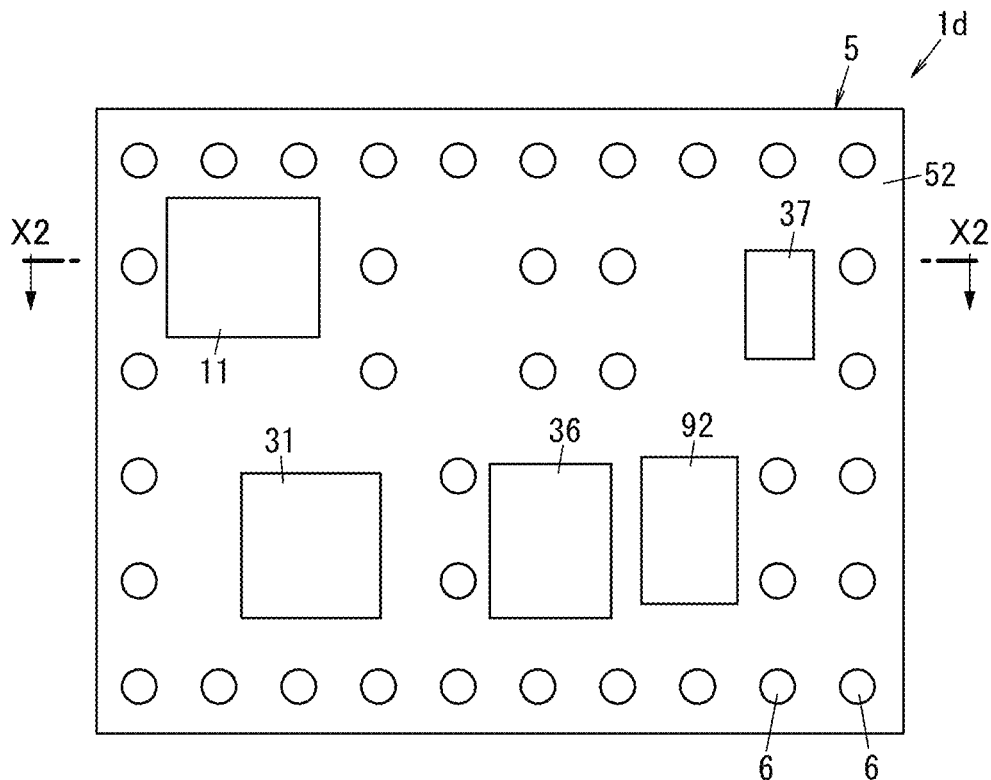
FIG. 11 is a bottom view of the radio-frequency module according to Embodiment 4.
Figure 12:
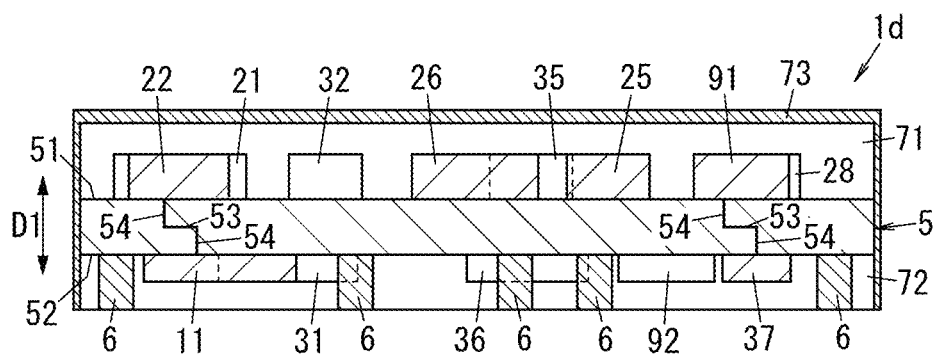
FIG. 12 is a sectional view of the radio-frequency module according to Embodiment 4.

Furthermore, as illustrated in FIGS. 10 to 12, the radio-frequency module 1d includes the mounting substrate 5, the plurality of external connection terminals 6, the first resin member 71, and the second resin member 72 similarly to the radio-frequency module 1 according to Embodiment 1 (refer to FIGS. 1 to 3). In addition, the radio-frequency module 1d includes a shield layer 73.

In Embodiment 4, the first transmission signal and the first reception signal of the first communication band and the second transmission signal and the second reception signal of the second communication band are all TDD signals.

2 Circuit Configuration of Radio-Frequency Module

Hereafter, the circuit configuration of the radio-frequency module 1d according to Embodiment 4 will be described while referring to FIG. 9. The first power amplifier 21, the first output matching network 22, the first input matching network 25, and the first low-noise amplifier 26 of Embodiment 4 have the same functions as the first power amplifier 21, the first output matching network 22, the first input matching network 25, and the first low-noise amplifier 26 of Embodiment 1 (refer to FIG. 4), and therefore description thereof is omitted. Similarly, the second power amplifier 31, the second output matching network 32, the second input matching network 35, and the second low-noise amplifier 36 of Embodiment 4 have the same functions as the second power amplifier 31, the second output matching network 32, the second input matching network 35, and the second low-noise amplifier 36 of Embodiment 1 (refer to FIG. 4), and therefore description thereof is omitted.

2.1 First Filter

The first filter 28 illustrated in FIG. 9 is a filter that allows a transmission signal and a reception signal of the first communication band to pass therethrough. In the example in FIG. 9, the first filter 28 is a low pass filter. The first filter 28 is provided between a common terminal 67 and the first switch 91 on the first transmission path T11 and the first reception path T12.

2.2 Second Filter

The second filter 37 illustrated in FIG. 9 is a filter that allows a transmission signal and a reception signal of the second communication band to pass therethrough. In the example in FIG. 9, the second filter 37 is a high pass filter. The second filter 37 is provided between the common terminal 67 and the second switch 92 on the second transmission path T21 and the second reception path T22.

2.3 First Switch

As illustrated in FIG. 9, the first switch 91 is a switch for selecting a path connected to the antenna 81. The first switch 91 has a common terminal 911 and a plurality of (two in the illustrated example) selection terminals 912 and 913. The common terminal 911 is connected to the first filter 28. The selection terminal 912 is connected to the first power amplifier 21 via the first output matching network 22. The selection terminal 913 is connected to the first low-noise amplifier 26 via the first input matching network 25.

2.4 Second Switch

As illustrated in FIG. 9, the second switch 92 is a switch for selecting a path connected to the antenna 81. The second switch 92 has a common terminal 921 and a plurality of (two in the illustrated example) selection terminals 922 and 923. The common terminal 921 is connected to the second filter 37. The selection terminal 922 is connected to the second power amplifier 31 via the second output matching network 32. The selection terminal 923 is connected to the second low-noise amplifier 36 via the second input matching network 35.

3 Structure of Radio-Frequency Module

Hereafter, the structure of the radio-frequency module 1d according to Embodiment 4 will be described while referring to the drawings.

As illustrated in FIGS. 10 to 12, the radio-frequency module 1*d* includes the mounting substrate 5, the plurality of external connection terminals 6, the first resin member 71, the second resin member 72, and the shield layer 73.

3.1 Circuit Elements for First Communication Band

Similarly, to the first power amplifier 21 of Embodiment 1 (refer to FIGS. 1 and 3), the first power amplifier 21 is disposed on the first main surface 51 of the mounting substrate 5 as illustrated in FIGS. 10 and 12. In the example in FIGS. 10 and 12, the first power amplifier 21 is mounted on the first main surface 51 of the mounting substrate 5. However, part of the first power amplifier 21 may be mounted on the first main surface 51 of the mounting substrate 5 and the remainder of the first power amplifier 21 may be built into the mounting substrate 5. In short, the first power amplifier 21 is disposed nearer to the first main surface 51 than to the second main surface 52 of the mounting substrate 5 and is at least partially mounted on the first main surface 51.

Similarly to the first output matching network 22 of Embodiment 1 (refer to FIGS. 1 and 3), the first output matching network 22 is disposed on the first main surface 51 of the mounting substrate 5 as illustrated in FIGS. 10 and 12. In the example in FIGS. 10 and 12, the first output matching network 22 is mounted on the first main surface 51 of the mounting substrate 5. The first output matching network 22 includes at least one out of an inductor and a capacitor. The inductor is, for example, a chip-like element that is mounted on the first main surface 51 of the mounting substrate 5 or a wiring pattern part that is built into the mounting substrate 5. The capacitor is, for example, a chip-like element that is mounted on the first main surface 51 of the mounting substrate 5 or a wiring pattern part that is built into the mounting substrate 5. In short, the first output matching network 22 is disposed nearer to the first main surface 51 than to the second main surface 52 of the mounting substrate 5 and is at least partially mounted on the first main surface 51.

As described above, the first filter 28 illustrated in FIGS. 10 and 12 functions as a first transmission filter that allows a transmission signal of the first communication band to pass therethrough and functions as a first reception filter that allows a reception signal of the first communication band to pass therethrough.

The first filter 28 illustrated in FIGS. 10 and 12 is, for example, an acoustic wave filter that includes a plurality of series arm resonators and a plurality of parallel arm resonators. The acoustic wave filter is, for example, a surface acoustic wave (SAW) filter that utilizes surface acoustic waves. In addition, the first filter 28 may include at least one out of an inductor and a capacitor that is serially connected to any one of the plurality of series arm resonators and may include an inductor or a capacitor that is serially connected to any one of the plurality of parallel arm resonators.

As illustrated in FIGS. 10 and 12, the first filter 28 is disposed on the first main surface 51 of the mounting substrate 5. In the example in FIGS. 10 and 12, the first filter 28 is mounted on the first main surface 51 of the mounting substrate 5. Part of the first filter 28 may be mounted on the first main surface 51 of the mounting substrate 5 and the remainder of the first filter 28 may be built into the mounting substrate 5. In short, the first filter 28 is disposed nearer to the first main surface 51 than to the second main surface 52 of the mounting substrate 5 and is at least partially mounted on the first main surface 51.

As illustrated in FIGS. 10 and 12, the first input matching network 25 is disposed on the first main surface 51 of the mounting substrate 5. The first input matching network 25 is, for example, mounted on the first main surface 51 of the mounting substrate 5. The first input matching network 25 includes at least one out of an inductor and a capacitor. The inductor is, for example, a chip-like element that is mounted on the first main surface 51 of the mounting substrate 5 or a wiring pattern part that is built into the mounting substrate 5. The capacitor is, for example, a chip-like element that is mounted on the first main surface 51 of the mounting substrate 5 or a wiring pattern part that is built into the mounting substrate 5. In short, the first input matching network 25 is disposed nearer to the first main surface 51 than to the second main surface 52 of the mounting substrate 5 and is at least partially mounted on the first main surface 51.

As illustrated in FIGS. 10 and 12, the first low-noise amplifier 26 is disposed on the first main surface 51 of the mounting substrate 5. The first low-noise amplifier 26 is, for example, mounted on the first main surface 51 of the mounting substrate 5. Part of the first low-noise amplifier 26 may be mounted on the first main surface 51 of the mounting substrate 5 and the remainder of the first low-noise amplifier 26 may be built into the mounting substrate 5. In short, the first low-noise amplifier 26 is disposed nearer to the first main surface 51 than to the second main surface 52 of the mounting substrate 5 and is at least partially mounted on the first main surface 51.

3.2 Circuit Elements for Second Communication Band

As illustrated in FIGS. 11 and 12, the second power amplifier 31 is disposed on the second main surface 52 of the mounting substrate 5. The second power amplifier 31 is, for example, mounted on the second main surface 52 of the mounting substrate 5. However, part of the second power amplifier 31 may be mounted on the second main surface 52 of the mounting substrate 5 and the remainder of the second power amplifier 31 may be built into the mounting substrate 5. In short, the second power amplifier 31 is disposed nearer to the second main surface 52 than to the first main surface 51 of the mounting substrate 5 and is at least partially mounted on the second main surface 52.

As illustrated in FIGS. 11 and 12, the second output matching network 32 is disposed on the first main surface 51 of the mounting substrate 5. The second output matching network 32 is, for example, mounted on the first main surface 51 of the mounting substrate 5. The second output matching network 32 includes at least one out of an inductor and a capacitor. The inductor is, for example, a chip-like element that is mounted on the first main surface 51 of the mounting substrate 5 or a wiring pattern part that is built into the mounting substrate 5. The capacitor is, for example, a chip-like element that is mounted on the first main surface 51 of the mounting substrate 5 or a wiring pattern part that is built into the mounting substrate 5. In short, the second output matching network 32 is disposed nearer to the first main surface 51 than to the second main surface 52 of the mounting substrate 5 and is at least partially mounted on the first main surface 51.

As illustrated in FIGS. 11 and 12, the second filter 37 is disposed on the second main surface 52 of the mounting substrate 5. In the example in FIGS. 11 and 12, the second filter 37 is mounted on the second main surface 52 of the mounting substrate 5. Part of the second filter 37 may be mounted on the second main surface 52 of the mounting substrate 5 and the remainder of the second filter 37 may be built into the mounting substrate 5. In short, the second filter 37 is disposed nearer to the second main surface 52 than to the first main surface 51 of the mounting substrate 5 and is at least partially mounted on the second main surface 52.

As illustrated in FIGS. 10 and 12, the second input matching network 35 is disposed on the first main surface 51 of the mounting substrate 5. The second input matching network 35 is, for example, mounted on the first main surface 51 of the mounting substrate 5. The second input matching network 35 includes at least one out of an inductor and a capacitor. The inductor is, for example, a chip-like element that is mounted on the first main surface 51 of the mounting substrate 5 or a wiring pattern part that is built into the mounting substrate 5. The capacitor is, for example, a chip-like element that is mounted on the first main surface 51 of the mounting substrate 5 or a wiring pattern part that is built into the mounting substrate 5. In short, the second input matching network 35 is disposed nearer to the first main surface 51 than to the second main surface 52 of the mounting substrate 5 and is at least partially mounted on the first main surface 51.

As illustrated in FIGS. 11 and 12, the second low-noise amplifier 36 is disposed on the second main surface 52 of the mounting substrate 5. In the example in FIGS. 11 and 12, the second low-noise amplifier 36 is mounted on the second main surface 52 of the mounting substrate 5. In other words, the second low-noise amplifier 36 is disposed nearer to the second main surface 52 than to the first main surface 51 of the mounting substrate 5 and is at least partially mounted on the second main surface 52.

The second transmission filter 33 and the second reception filter 34 are used in transmission and reception of TDD signals. It is often the case that a single filter that allows TDD signals to pass therethrough is used for both transmission and reception, but in Embodiment 1, a transmission filter that allows a transmission signal to pass therethrough (second transmission filter 33) and a reception filter that allows a reception signal to pass therethrough (second reception filter 34) are separated provided. The second transmission filter 33 is disposed on the first main surface 51 of the mounting substrate 5 and the second reception filter 34 is disposed on the second main surface 52 of the mounting substrate 5.

3.3 First Switch and Second Switch

As illustrated in FIG. 12, the first switch 91 is disposed on the first main surface 51 of the mounting substrate 5. The first switch 91 is, for example, mounted on the first main surface 51 of the mounting substrate 5. Alternatively, part of the first switch 91 may be mounted on the first main surface 51 of the mounting substrate 5 and the remainder of the first switch 91 may be built into the mounting substrate 5. In short, the first switch 91 is disposed nearer to the first main surface 51 than to the second main surface 52 of the mounting substrate 5 and is at least partially mounted on the first main surface 51.

As illustrated in FIG. 12, the second switch 92 is disposed on the second main surface 52 of the mounting substrate 5. The second switch 92 is, for example, mounted on the second main surface 52 of the mounting substrate 5. Alternatively, part of the second switch 92 may be mounted on the second main surface 52 of the mounting substrate 5 and the remainder of the second switch 92 may be built into the mounting substrate 5. In short, the second switch 92 is disposed nearer to the second main surface 52 than to the first main surface 51 of the mounting substrate 5 and is at least partially mounted on the second main surface 52.

3.4 Outer Connection Terminals

Similarly, to the external connection terminals 6 of Embodiment 1 (refer to FIGS. 2 and 3), the plurality of external connection terminals 6 are disposed on the second main surface 52 of the mounting substrate 5. The plurality of external connection electrodes 6 are columnar (for example, cylindrical) electrodes provided on the second main surface 52 of the mounting substrate 5. The material of the plurality of external connection terminals 6 is, for example, a metal (for example, copper, a copper alloy, and so forth). Each of the plurality of external connection terminals 6 has, in the thickness direction D1 of the mounting substrate 5, a base end portion that is bonded to the second main surface 52 of the mounting substrate 5 and a tip end portion that is on the opposite side from the base end portion. The tip end portion of each of the plurality of external connection terminals 6 may include a metal plating layer, for example.

3.5 First Resin Member and Second Resin Member

Similarly, to the first resin member 71 of Embodiment 1 (refer to FIG. 3), as illustrated in FIG. 12, the first resin member 71 is provided on the side where the first main surface 51 of the mounting substrate 5 is located and covers circuit elements disposed on the first main surface 51 and the first main surface 51 of the mounting substrate 5. The first resin member 71 has a function of ensuring reliability in terms of the mechanical strength, moisture resistance, and so forth of the circuit elements disposed on the first main surface 51.

Similarly to the second resin member 72 of Embodiment 1 (refer to FIG. 3), as illustrated in FIG. 12, the second resin member 72 is provided on the side where the second main surface 52 of the mounting substrate 5 is located and covers circuit elements disposed on the second main surface 52 and the second main surface 52 of the mounting substrate 5. The second resin member 72 has a function of ensuring reliability in terms of the mechanical strength, moisture resistance, and so forth of the circuit elements disposed on the second main surface 52.

3.6 Arrangement Relationships

As illustrated in FIGS. 10 and 12, in the radio-frequency module 1*d*, the first power amplifier 21, the first output matching network 22, the first input matching network 25, the first low-noise amplifier 26, the first filter 28, and the first switch 91 are disposed on the side where the first main surface 51 of the mounting substrate 5 is located. In addition, the second output matching network 32 and the second input matching network 35 are disposed on the side where the first main surface 51 of the mounting substrate 5 is located. On the other hand, in the radio-frequency module 1*d*, as illustrated in FIGS. 11 and 12, the second power amplifier 31, the second low-noise amplifier 36, the second filter 37, and a power amplifier controller 11 are disposed on the side where the second main surface 52 of the mounting substrate 5 is located.

This makes it possible to reduce leakage of the first transmission signal from the first power amplifier 21, the first output matching network 22, and the first filter 28 to the second output matching network 32, the second input matching network 35, and the second low-noise amplifier 36. In particular, when the frequency of a harmonic wave of the first transmission signal is contained in the reception band of the second communication band, leakage of the harmonic wave of the first transmission signal to the second output matching network 32, the second input matching network 35, and the second low-noise amplifier 36 can be reduced.

As illustrated in FIGS. 10 and 12, in the radio-frequency module 1*d* according to Embodiment 4, the first power amplifier 21 and the first low-noise amplifier 26 are not disposed adjacent to each other. Another circuit element is disposed between the first power amplifier 21 and the first low-noise amplifier 26. In the example in FIGS. 10 and 12, the second output matching network 32 is disposed between the first power amplifier 21 and the first low-noise amplifier 26.

In addition, the first low-noise amplifier 26 and the first switch 91 are not disposed adjacent to each other. Another circuit element is disposed between the first low-noise amplifier 26 and the first switch 91. In the example in FIGS. 10 and 12, the first input matching network 25 is disposed between the first low-noise amplifier 26 and the first switch 91.

4 Effects

In the radio-frequency module 1d according to Embodiment 4, the first power amplifier 21, the first output matching network 22, and the first filter 28 (transmission circuit elements), which are used for a transmission signal of the first communication band, are disposed on the side where the first main surface 51 of the mounting substrate 5 is located. In addition, the second low-noise amplifier 36 and the second filter 37 (reception circuit elements), which are used for a reception signal of the second communication band, are disposed on the side where the second main surface 52 of the mounting substrate 5 is located. Since the transmission circuit elements and the reception circuit elements are disposed on opposite sides from each other with the mounting substrate 5 therebetween, leaking of a harmonic wave of the first transmission signal to the reception circuit elements can be made less likely to occur. As a result, isolation between transmission of the first transmission signal and reception of the second reception signal can be improved. This enables reception sensitivity to the second reception signal to be improved.

5 Modifications

Hereafter, modifications of Embodiment 4 will be described.

As a modification of Embodiment 4, the first output matching network 22 and the second input matching network 35 are not restricted to being disposed on the same main surface side of the mounting substrate 5 and may be disposed on opposite main surface sides of the mounting substrate 5.

As another modification of Embodiment 4, the second power amplifier 31 is not limited to being disposed on the side where the second main surface 52 of the mounting substrate 5 is located and may be disposed on the side where the first main surface 51 of the mounting substrate 5 is located.

As another modification of Embodiment 4, the first low-noise amplifier 26 is not limited to being disposed on the side where the first main surface 51 of the mounting substrate 5 is located and may be disposed on the side where the second main surface 52 of the mounting substrate 5 is located.

As another modification of Embodiment 4, the first switch 91 is not limited to being disposed on the side where the first main surface 51 of the mounting substrate 5 is located and may be disposed on the side where the second main surface 52 of the mounting substrate 5 is located.

The radio-frequency modules according to these modifications also exhibit the same effects as the radio-frequency module 1d according to Embodiment 4.

The above-described embodiments and modifications are merely some examples of various embodiments and modifications of the present disclosure. In addition, so long as the object of the present disclosure is achieved, the embodiments and modifications can be changed in various ways in accordance with the design and so forth.

Aspects

The following aspects are disclosed in the present specification.

A radio-frequency module according to a First Aspect (1; 1a; 1b; 1c; 1d) includes a mounting substrate (5), a transmission circuit element (first power amplifier 21; first output matching network 22; first transmission filter 23; 23b; 23c), and a reception circuit element (second reception filter 34; second input matching network 35; second low-noise amplifier 36). The mounting substrate (5) has a first main surface (51) and a second main surface (52). The first main surface (51) and the second main surface (52) face each other. The transmission circuit element is provided on a signal path for a transmission signal of a first communication band (first transmission path T11). The reception circuit element is provided on a signal path for a reception signal of a second communication band (second reception path T22). The second communication band is higher than the first communication band. The transmission circuit element is disposed on a side where the first main surface (51) of the mounting substrate (5) is located. The reception circuit element is disposed on a side where the second main surface (52) of the mounting substrate (5) is located.

With the radio-frequency module (1; 1a; 1b; 1c; 1d) according to the First Aspect, since the transmission circuit element (first power amplifier 21; first output matching network 22; first transmission filter 23; 23b; 23c) and the reception circuit element (second reception filter 34; second input matching network 35; second low-noise amplifier 36) are disposed on opposite sides from each other with the mounting substrate (5) therebetween, leaking of a harmonic wave of the transmission signal of the first communication band to the reception circuit element can be made less likely to occur. As a result, isolation between transmission of the transmission signal of the first communication band and reception of the reception signal of the second communication band can be improved. Thus, reception sensitivity to the reception signal of the second communication band can be improved.

In a radio-frequency module (1; 1a; 1b; 1c) according to a Second Aspect based on the First Aspect, the transmission signal of the first communication band is an FDD or TDD signal and the reception signal of the second communication band is an FDD or TDD signal.

In a radio-frequency module (1; 1a; 1b; 1c) according to a Third Aspect based on the Second Aspect, the transmission signal of the first communication band is an FDD signal and the reception signal of the second communication band is a TDD signal.

In a radio-frequency module (1d) according to a Fourth Aspect based on the Second Aspect, the transmission signal of the first communication band and the reception signal of the second communication band are TDD signals.

In a radio-frequency module (1; 1a; 1b; 1c; 1d) according to a Fifth Aspect based on any one of the First to Fourth Aspects, the transmission circuit element includes a plurality of transmission circuit elements and the transmission circuit elements include a transmission filter for the first communication band (first transmission filter 23; 23b; 23c). The transmission filter for the first communication band allows the transmission signal of the first communication band to pass therethrough. The reception circuit element includes a plurality of reception circuit elements and the reception circuit elements include a reception filter for the second communication band (second reception filter 34). The reception filter for the second communication band allows the reception signal of the second communication band to pass therethrough. The transmission filter for the first communication band is disposed on a side where the first main surface (51) of the mounting substrate (5) is located. The reception filter for the second communication band is disposed on a side where the second main surface (52) of the mounting substrate (5) is located.

In a radio-frequency module (1; 1*a*; 1*b*; 1*c*; 1*d*) according to a Sixth Aspect based any one of the First to Fourth Aspects, the reception circuit element includes a plurality of reception circuit elements and the reception circuit elements include a low-noise amplifier (second low-noise amplifier 36). The low-noise amplifier amplifies the amplitude of the reception signal of the second communication band. The low-noise amplifier is disposed on a side where the second main surface (52) of the mounting substrate (5) is located.

In a radio-frequency module (1; 1*a*; 1*b*; 1*c*; 1*d*) according to a Seventh Aspect based on any one of the First to Fourth Aspects, the transmission circuit element includes a plurality of transmission circuit elements and the transmission circuit elements include a power amplifier (first power amplifier 21). The power amplifier amplifies the amplitude of the transmission signal of the first communication band. The reception circuit element includes a plurality of reception circuit elements and the reception circuit elements include a reception filter for the second communication band (second reception filter 34). The reception filter for the second communication band allows the reception signal of the second communication band to pass therethrough. The power amplifier is disposed on a side where the first main surface (51) of the mounting substrate (5) is located. The reception filter for the second communication band is disposed on a side where the second main surface (52) of the mounting substrate (5) is located.

A radio-frequency module (1; 1*a*; 1*b*) according to an Eighth Aspect based on any one of the First to Seventh Aspects further includes a transmission filter for the second communication band (second transmission filter 33). The transmission filter for the second communication band allows a transmission signal of the second communication band to pass therethrough. The reception circuit element includes a plurality of reception circuit elements and the reception circuit elements include a reception filter for the second communication band (second reception filter 34). The reception filter for the second communication band allows the reception signal of the second communication band to pass therethrough. The transmission filter for the second communication band is provided separately from the reception filter for the second communication band. The transmission filter for the second communication band is disposed on a side where the first main surface (51) of the mounting substrate (5) is located. The reception filter for the second communication band is disposed on a side where the second main surface (52) of the mounting substrate (5) is located.

A radio-frequency module (1*b*) according to a Ninth Aspect based on any one of the First to Eighth Aspects further includes a reception filter for the first communication band (first reception filter 24*b*). The reception filter for the first communication band allows a reception signal of the first communication band to pass therethrough. The transmission circuit element includes a plurality of transmission circuit elements and the transmission circuit elements include a transmission filter for the first communication band (first transmission filter 23*b*). The transmission filter for the first communication band allows the transmission signal of the first communication band to pass therethrough. The reception filter for the first communication band is provided separately from the transmission filter for the first communication band. The reception filter for the first communication band is disposed on a side where the second main surface (52) of the mounting substrate (5) is located. The transmission filter for the first communication band is disposed on a side where the first main surface (51) of the mounting substrate (5) is located.

In the radio-frequency module (1*b*) according to the Ninth Aspect, the transmission filter for the first communication band (first transmission filter 23*b*) and the reception filter for the first communication band (first reception filter 24*b*) are disposed on opposite sides from each other with the mounting substrate (5) therebetween. This enables the isolation between transmission in the first communication band and reception in the first communication band to be improved.

A radio-frequency module (1*c*; 1*d*) according to a Tenth Aspect based on any one of the First to Eighth Aspects further includes a reception filter for the first communication band (first reception filter 24*c*; first filter 28). The reception filter for the first communication band allows a reception signal of the first communication band to pass therethrough. The transmission circuit element includes a plurality of transmission circuit elements and the transmission circuit elements include a transmission filter for the first communication band (first transmission filter 23*c*; first filter 28). The transmission filter for the first communication band allows the transmission signal of the first communication band to pass therethrough. The reception circuit element includes a plurality of reception circuit elements and the reception circuit elements include a reception filter for the second communication band (second reception filter 34; second filter 37). The reception filter for the second communication band allows the reception signal of the second communication band to pass therethrough. The reception filter for the first communication band is provided separately from the transmission filter for the first communication band. The reception filter for the first communication band is disposed on a side where the first main surface (51) of the mounting substrate (5) is located. The transmission filter for the first communication band is disposed on a side where the first main surface (51) of the mounting substrate (5) is located. The reception filter for the second communication band is disposed on a side where the second main surface (52) of the mounting substrate (5) is located.

With the radio-frequency module (1*c*; 1*d*) according to the Tenth Aspect, isolation between transmission in the first communication band and reception in the second communication band can be improved while increasing the degree of freedom with which circuit elements can be disposed on the side where the second main surface (52) of the mounting substrate (5) is located.

In a radio-frequency module (1; 1*a*; 1*b*; 1*c*; 1*d*) according to an Eleventh Aspect based on any one of the First to Tenth Aspects, the transmission circuit element includes a plurality of transmission circuit elements and the transmission circuit elements include a power amplifier (first power amplifier 21). The power amplifier amplifies the amplitude of the transmission signal of the first communication band. The reception circuit element includes a plurality of reception circuit elements and the reception circuit elements include a low-noise amplifier (second low-noise amplifier 36). The low-noise amplifier amplifies the amplitude of the reception signal of the second communication band. The power amplifier is disposed on a side where the first main surface (51) of the mounting substrate (5) is located. The low-noise amplifier is disposed on a side where the second main surface (52) of the mounting substrate (5) is located.

In a radio-frequency module (1d) according to a Twelfth Aspect based on any one of the First to Eleventh Aspects, the transmission circuit element includes a plurality of transmission circuit elements and the transmission circuit elements include a first inductor (inductor 221). The first inductor is provided on an output side of the power amplifier (first power amplifier 21) on the signal path for the transmission signal of the first communication band (first transmission path T11). The power amplifier amplifies the amplitude of the transmission signal of the first communication band. The reception circuit element includes a plurality of reception circuit elements and the reception circuit elements include a second inductor (inductor 351). The second inductor is provided on an input side of the low-noise amplifier (second low-noise amplifier 36) on the signal path for the reception signal of the second communication band (second reception path T22). The low-noise amplifier amplifies the amplitude of the reception signal of the second communication band. The first inductor is disposed on a side where the first main surface (51) of the mounting substrate (5) is located. The second inductor is disposed on a side where the second main surface (52) of the mounting substrate (5) is located.

A radio-frequency module (1; 1a; 1b; 1c; 1d) according to a Thirteenth Aspect based on any one of the First to Twelfth Aspects further includes a plurality of external connection terminals (6; 6a). The plurality of external connection terminals (6; 6a) are disposed on a side where the second main surface (52) of the mounting substrate (5) is located.

In a radio-frequency module (1; 1a; 1b; 1c; 1d) according to a Fourteenth Aspect based on any one of the First to Thirteenth Aspects, communication in the first communication band and communication in the second communication band are simultaneously performed.

In the radio-frequency module (1; 1a; 1b; 1c; 1d) according to the Fourteenth Aspect, communication in the first communication band and communication in the second communication band are simultaneously performed. In the simultaneous communication, a harmonic wave of the transmission signal of the first communication band can be made unlikely to leak to the reception circuit element (second reception filter 34; second input matching network 35; second low-noise amplifier 36; second filter 37) even in a situation where there is likely to be an effect from the transmission signal of the first communication band. As a result, isolation between transmission of the transmission signal of the first communication band and reception of the reception signal of the second communication band can be improved even in the case of simultaneous communication.

A communication device (8; 8b) according to a Fifteenth Aspect includes a radio-frequency module (1; 1a; 1b; 1c; 1d) according to any one of First to Fourteenth Aspects and a signal processing circuit (RF signal processing circuit 83, baseband signal processing circuit 84). The signal processing circuit processes the transmission signal of the first communication band and the reception signal of the second communication band.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio-frequency module comprising:
   a mounting substrate having a first main surface and a second main surface, which are on opposite sides of the mounting substrate;
   a transmission circuit element that is provided on a signal path for a transmission signal of a first communication band; and
   a reception circuit element provided in a signal path for a reception signal of a second communication band, the second communication band being higher in frequency than the first communication band,
   wherein the transmission circuit element is disposed on a same side of the mounting substrate as the first main surface of the mounting substrate, and
   the reception circuit element is disposed on a same side of the mounting substrate as the second main surface of the mounting substrate.

2. The radio-frequency module according to claim 1,
   wherein the transmission signal of the first communication band is an FDD transmission signal or a TDD transmission signal, and
   the reception signal of the second communication band is an FDD reception signal or a TDD reception signal.

3. The radio-frequency module according to claim 2,
   wherein the transmission signal of the first communication band is the FDD transmission signal, and
   the reception signal of the second communication band is the TDD reception signal.

4. The radio-frequency module according to claim 2,
   wherein the transmission signal of the first communication band is the TDD transmission signal, and the reception signal of the second communication band is the TDD reception signal.

5. The radio-frequency module according to claim 1, further comprising:
   a plurality of transmission circuit elements, the transmission circuit element being one of the plurality of transmission circuit elements, the plurality of transmission circuit elements include a transmission filter for the first communication band that allows the transmission signal of the first communication band to pass therethrough; and
   a plurality of reception circuit elements, the reception circuit element being one of the plurality of reception circuit elements, the plurality of reception circuit elements include a reception filter for the second communication band that allows the reception signal of the second communication band to pass therethrough, wherein
   the transmission filter for the first communication band is disposed on the same side of the mounting substrate as the first main surface of the mounting substrate, and
   the reception filter for the second communication band is disposed on the same side of the mounting substrate as the second main surface of the mounting substrate.

6. The radio-frequency module according to claim 1, further comprising
   a plurality of reception circuit elements, the reception circuit element being one of the reception circuit elements, and the plurality of reception circuit elements include a low-noise amplifier that amplifies an amplitude of the reception signal of the second communication band, and the low-noise amplifier is disposed on the same side of the mounting substrate as the second main surface of the mounting substrate.

7. The radio-frequency module according to claim 1, further comprising:
a plurality of transmission circuit elements, the transmission circuit element being one of the plurality of transmission circuit elements, the plurality of transmission circuit elements include a power amplifier that amplifies an amplitude of the transmission signal of the first communication band; and
a plurality of reception circuit elements, the reception circuit element being one of the plurality of reception circuit elements, the plurality of reception circuit elements include a reception filter for the second communication band that allows the reception signal of the second communication band to pass therethrough, wherein
the power amplifier is disposed on the same side of the mounting substrate as the first main surface of the mounting substrate, and
the reception filter for the second communication band is disposed on the same side of the mounting substrate as the second main surface of the mounting substrate.

8. The radio-frequency module according to claim 1, further comprising:
a transmission filter for the second communication band that allows a transmission signal of the second communication band to pass therethrough; and
a plurality of reception circuit elements, the reception circuit element being one of the plurality of reception circuit elements, the plurality of reception circuit elements include a reception filter for the second communication band that allows the reception signal of the second communication band to pass therethrough, wherein
the transmission filter for the second communication band is provided separately from the reception filter for the second communication band and is disposed on the same side of the mounting substrate as the first main surface of the mounting substrate, and
the reception filter for the second communication band is disposed on the same side of the mounting substrate as the second main surface of the mounting substrate.

9. The radio-frequency module according to claim 1, further comprising:
a reception filter for the first communication band that allows a reception signal of the first communication band to pass therethrough; and
a plurality of transmission circuit elements, the transmission circuit element being one of the plurality of transmission circuit elements, the plurality of transmission circuit elements include a transmission filter for the first communication band that allows the transmission signal of the first communication band to pass therethrough; wherein
the reception filter for the first communication band is provided separately from the transmission filter for the first communication band and is disposed on the same side of the mounting surface as the second main surface of the mounting substrate, and
the transmission filter for the first communication band is disposed on the same side of the mounting substrate as the first main surface of the mounting substrate.

10. The radio-frequency module according to claim 1, further comprising:
a reception filter for the first communication band that allows a reception signal of the first communication band to pass therethrough;
a plurality of transmission circuit elements, the transmission circuit element being one of the plurality of transmission circuit elements, the plurality of transmission circuit elements include a transmission filter for the first communication band that allows the transmission signal of the first communication band to pass therethrough; and
a plurality of reception circuit elements, the reception circuit element being one of the plurality of reception circuit elements, the plurality of reception circuit elements include a reception filter for the second communication band that allows the reception signal of the second communication band to pass therethrough, wherein
the reception filter for the first communication band is provided separately from the transmission filter for the first communication band and is disposed on the same side of the mounting substrate as the first main surface of the mounting substrate,
the transmission filter for the first communication band is disposed on the same side of the mounting substrate as the first main surface of the mounting substrate, and
the reception filter for the second communication band is disposed on the same side of the mounting substrate as the second main surface of the mounting substrate.

11. The radio-frequency module according to claim 1, further comprising:
a plurality of transmission circuit elements, the transmission circuit element being one of the plurality of transmission circuit elements, the plurality of transmission circuit elements include a power amplifier that amplifies an amplitude of the transmission signal of the first communication band; and
a plurality of reception circuit elements, the reception circuit element being one of the plurality of reception circuit elements, the plurality of reception circuit elements include a low-noise amplifier that amplifies an amplitude of the reception signal of the second communication band,
the power amplifier is disposed on the same side of the mounting substrate as the first main surface of the mounting substrate, and
the low-noise amplifier is disposed on the same side of the mounting substrate as the second main surface of the mounting substrate.

12. The radio-frequency module according to claim 1, further comprising:
a plurality of transmission circuit elements, the transmission circuit element being one of the plurality of transmission circuit elements, the plurality of transmission circuit elements include a first inductor that is provided on an output side of a power amplifier, which amplifies an amplitude of the transmission signal of the first communication band, on the signal path for the transmission signal of the first communication band; and
a plurality of reception circuit elements, the reception circuit element being one of the plurality of reception circuit elements, the plurality of reception circuit elements include a second inductor that is provided on an input side of a low-noise amplifier, which amplifies an amplitude of the reception signal of the second communication band, on the signal path for the reception signal of the second communication band, the first inductor is disposed on the same side of the mounting substrate as the first main surface of the mounting substrate, and the second inductor is disposed on the same side of the mounting substrate as the second main surface of the mounting substrate.

13. The radio-frequency module according to claim 1, further comprising:

a plurality of external connection terminals that are disposed on the same side of the mounting substrate as the first main surface or the second main surface of the mounting substrate.

14. The radio-frequency module according to claim 1, wherein the transmission circuit element and the reception circuit element are configured to respectively perform communication in the first communication band and the second communication band simultaneously.

15. A communication device comprising:

a signal processing circuit that processes a transmission signal of a first communication band and a reception signal of the second communication band; and a radio-frequency module that includes
- a mounting substrate having a first main surface and a second main surface, which are on opposite sides of the mounting substrate,
- a transmission circuit element that is provided on a signal path for the transmission signal of the first communication band, and
- a reception circuit element provided in a signal path for the reception signal of the second communication band, the second communication band being higher in frequency than the first communication band, wherein the transmission circuit element is disposed on a same side of the mounting substrate as the first main surface of the mounting substrate, and the reception circuit element is disposed on a same side of the mounting substrate as the second main surface of the mounting substrate.

16. The communication device of claim 15, wherein the transmission signal of the first communication band is an FDD transmission signal or a TDD transmission signal, and the reception signal of the second communication band is an FDD reception signal or a TDD reception signal.

17. The communication device of claim 16, wherein the transmission signal of the first communication band is the FDD transmission signal, and the reception signal of the second communication band is the TDD reception signal.

18. The communication device of claim 16, wherein the transmission signal of the first communication band is the TDD transmission signal, and the reception signal of the second communication band is the TDD reception signal.

19. The communication device of claim 15, wherein the radio-frequency module, further comprising:

a plurality of transmission circuit elements, the transmission circuit element being one of the plurality of transmission circuit elements, the plurality of transmission circuit elements include a transmission filter for the first communication band that allows the transmission signal of the first communication band to pass therethrough; and a plurality of reception circuit elements, the reception circuit element being one of the plurality of reception circuit elements, the plurality of reception circuit elements include a reception filter for the second communication band that allows the reception signal of the second communication band to pass therethrough, wherein the transmission filter for the first communication band is disposed on the same side of the mounting substrate as the first main surface of the mounting substrate, and the reception filter for the second communication band is disposed on the same side of the mounting substrate as the second main surface of the mounting substrate.

20. The communication device of claim 15, wherein the radio-frequency module, further comprising:

a plurality of reception circuit elements, the reception circuit element being one of the reception circuit elements, and the plurality of reception circuit elements include a low-noise amplifier that amplifies an amplitude of the reception signal of the second communication band, and the low-noise amplifier is disposed on the same side of the mounting substrate as the second main surface of the mounting substrate.

* * * * *